(12) United States Patent
Yamane et al.

(10) Patent No.: US 11,086,986 B2
(45) Date of Patent: Aug. 10, 2021

(54) PROCESSING CONTROL APPARATUS, PROCESSING CONTROL METHOD, AND NON-TRANSITORY RECODING MEDIUM

(71) Applicant: NEC CORPORATION, Tokyo (JP)

(72) Inventors: Masato Yamane, Tokyo (JP); Yuki Ashino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 363 days.

(21) Appl. No.: 16/312,354

(22) PCT Filed: Jun. 21, 2017

(86) PCT No.: PCT/JP2017/022858
§ 371 (c)(1),
(2) Date: Dec. 21, 2018

(87) PCT Pub. No.: WO2017/221979
PCT Pub. Date: Dec. 28, 2017

(65) Prior Publication Data
US 2019/0236270 A1   Aug. 1, 2019

(30) Foreign Application Priority Data

Jun. 23, 2016  (JP) .............................. JP2016-124682

(51) Int. Cl.
*H04L 29/06*  (2006.01)
*G06F 21/55*  (2013.01)
(Continued)

(52) U.S. Cl.
CPC .......... *G06F 21/55* (2013.01); *G06F 9/45533* (2013.01); *H04L 9/14* (2013.01);
(Continued)

(58) Field of Classification Search
CPC . G06F 9/45533; G06F 21/55; H04L 63/1433; H04L 63/0428; H04L 63/1408; H04L 9/14
See application file for complete search history.

(56) References Cited

U.S. PATENT DOCUMENTS 8,990,933 B1    3/2015 Magdalin
10,050,999 B1 *  8/2018 Rossman ............ H04L 63/1433
(Continued)

FOREIGN PATENT DOCUMENTS

| JP | 2005-134972 A | 5/2005 |
| JP | 2005-182187 A | 7/2005 |

(Continued)

OTHER PUBLICATIONS

Notice of Reasons of Refusal dated Aug. 8, 2017.
(Continued)

*Primary Examiner* — Mohammad A Siddiqi
(74) *Attorney, Agent, or Firm* — Sughrue Mion, PLLC

(57) ABSTRACT

Provided is a process control device, etc. capable of more reliably maintaining the soundness of an information processing system with regard to cybersecurity. A processing control device calculates a sum of a value indicating a risk included in processing information that includes one or more processing executed on an information processing apparatus during a certain period; and restricts processing to the information processing apparatus when the calculated sum value for the processing information satisfies a predetermined restriction condition.

6 Claims, 27 Drawing Sheets

(51) Int. Cl.
   *H04L 9/14*      (2006.01)
   *G06F 9/455*     (2018.01)
(52) U.S. Cl.
   CPC ...... *H04L 63/0428* (2013.01); *H04L 63/1408* (2013.01); *H04L 63/1433* (2013.01)

(56) References Cited

U.S. PATENT DOCUMENTS

| | | | | |
|---|---|---|---|---|
| 10,489,786 | B2* | 11/2019 | Yu | G06Q 20/4016 |
| 2011/0185056 | A1* | 7/2011 | McHugh | G06F 21/577 |
| | | | | 709/224 |
| 2014/0006797 | A1* | 1/2014 | Cordella | G06F 12/1408 |
| | | | | 713/189 |
| 2014/0250496 | A1 | 9/2014 | Amidon et al. | |
| 2015/0350234 | A1 | 12/2015 | Reno et al. | |
| 2016/0301669 | A1* | 10/2016 | Muma | H04L 63/0428 |

FOREIGN PATENT DOCUMENTS

| | | |
|---|---|---|
| JP | 2009-031859 A | 2/2009 |
| JP | 2010-517164 A | 5/2010 |
| JP | 2012-194814 A | 10/2012 |
| JP | 2013-254337 A | 12/2013 |
| JP | 2015-156150 A | 8/2015 |
| KR | 10-2009-0107035 A | 10/2009 |
| WO | 2016/047115 A1 | 3/2016 |

OTHER PUBLICATIONS

Notice of Reasons of Refusal dated Dec. 19, 2017.
International Search Report for PCT/JP2017/022858 dated Aug. 8, 2017 [PCT/ISA/210].
Written Opinion for PCT/JP2017/022858 dated Aug. 8, 2017 [PCT/ISA/237].
Communication dated May 15, 2019, from the European Patent Office in counterpart European Application No. 17815447.2.
Communication dated Feb. 26, 2020, issued by the Korean Intellectual Property Office in Korean Application No. 10-2018-7037255.

* cited by examiner

Fig. 7

KEY CANDIDATE DETERMINATION INFORMATION (104b)

| ENCRYPTION ALGORITHM (701) | ENCRYPTION PARAMETER (702) | | EXECUTION ENVIRONMENT INFORMATION (703) | KEY CANDIDATE DETERMINATION CRITERION (704) |
|---|---|---|---|---|
| | KEY LENGTH (UNIT: BIT) | CIPHER MODE OF OPERATION | | |
| AES | 128 | CBC | A | 16 CONSECUTIVE BYTES OF DATA AREA WITH ENTROPY VALUE GREATER THAN OR EQUAL TO SPECIFIC REFERENCE VALUE |
| AES | 256 | CBC | B | 32 CONSECUTIVE BYTES OF DATA AREA WITH ENTROPY VALUE GREATER THAN OR EQUAL TO SPECIFIC REFERENCE VALUE |
| AES | 128 | GCM | C | 560 CONSECUTIVE BYTES OF DATA STARTING FROM 0x30, 0x02, 0x00, 0x00, 0x4b, 0x53, 0x4D |
| ... | ... | ... | ... | ... |

Fig. 8

KEY CANDIDATE STORAGE UNIT — 104c

| ENCRYPTION ALGORITHM (801) | ENCRYPTION PARAMETER (802) | | KEY DATA CANDIDATE (803) |
|---|---|---|---|
| | KEY LENGTH (UNIT: BIT) | MODE | |
| AES | 128 | CBC | 0x**,0x**,0x** ··· (16 CONSECUTIVE BYTES OF DATA) |
| AES | 256 | CBC | 0x**,0x**,0x** ··· (32 CONSECUTIVE BYTES OF DATA) |
| AES | 128 | GCM | 0x30,0x02,0x00,0x00,0x4b,0x53,0x4D ··· (560 CONSECUTIVE BYTES OF DATA) |
| ··· | ··· | ··· | ··· |

PROCESSING CONTROL APPARATUS, PROCESSING CONTROL METHOD, AND NON-TRANSITORY RECODING MEDIUM

CROSS REFERENCE TO RELATED APPLICATIONS

This application is a National Stage of International Application No. PCT/JP2017/022858 filed Jun. 21, 2017, claiming priority based on Japanese Patent Application No. 2016-124682 filed Jun. 23, 2016, the disclosure of which is incorporated herein in its entirety by reference.

TECHNICAL FIELD

The present invention relates to a processing control apparatus that controls an information processing apparatus and the like.

BACKGROUND ART

PTL 1 discloses an unauthorized access detection system capable of detecting unauthorized access even when suffering the unauthorized access. The unauthorized access detection system includes a monitoring unit, an analysis unit, a determination unit, and a counter-unauthorized-access unit. The monitoring unit monitors an access request executed in a communication network system as a monitoring target, through a communication network. The analysis unit analyzes an access request monitored by the monitoring unit, as a command string. Based on the analysis result, the determination unit determines whether or not the access request is unauthorized. When the access request is determined to be unauthorized, the counter-unauthorized-access unit executes processing against the access request.

CITATION LIST

Patent Literature

PTL 1: Japanese Unexamined Patent Application Publication No. 2005-182187

SUMMARY OF INVENTION

Technical Problem

However, accurate detection of unauthorized access is difficult even when the unauthorized access detection system disclosed in PTL 1 is used. The reason is that, even though a series of processing operations are often executed in unauthorized access, the unauthorized access detection system determines whether or not certain access is unauthorized, based on only whether or not a command string executed on the certain access includes a certain command. Consequently, even when the unauthorized access detection system is used, a probability of securing cybersecurity in the communication network system is low because a determination of unauthorized access may not be accurate.

Accordingly, one of objectives of the present invention is to provide a processing control apparatus and the like capable of more reliably maintaining soundness of an information processing system in a cybersecurity field.

Advantageous Effects of Invention

Solution to Problem

As an aspect of the present invention, a processing control apparatus including:

risk calculation means for calculating a sum of a value indicating a risk included in processing information that includes one or more processing executed on an information processing apparatus during a certain period; and processing control means for restricting processing to the information processing apparatus when the calculated sum value for the processing information satisfies a predetermined restriction condition.

In addition, as another aspect of the present invention, a processing control method including:

calculating a sum of a value indicating a risk included in processing information that includes one or more processing executed on an information processing apparatus during a certain period; and restricting processing to the information processing apparatus when the calculated sum value for the processing information satisfies a predetermined restriction condition.

In addition, as another aspect of the present invention, a processing control program causing a computer to achieve:

a risk calculation function for calculating a sum of a value indicating a risk included in processing information that includes one or more processing executed on an information processing apparatus during a certain period; and a processing control function for restricting processing to the information processing apparatus when the calculated sum value for the processing information satisfies a predetermined restriction condition.

Furthermore, the object is also achieved by a computer-readable recording medium that records the program.

Advantageous Effects of Invention

A processing control apparatus and the like according to the present invention are able to more reliably maintain soundness of an information processing system in a cybersecurity field.

BRIEF DESCRIPTION OF DRAWINGS

FIG. 7 is a diagram illustrating an example of key candidate determination information according to the first example embodiment.

FIG. 8 is a diagram illustrating an example of a key candidate storage unit according to the first example embodiment.

EXAMPLE EMBODIMENT

In the following, example embodiments of the present invention will be described in detail with reference to the drawings.

An analysis system described in the following respective example embodiments may be a system including one or more components of the system achieved by a plurality of physically or logically separated apparatuses (for example, a physical information processing apparatus and a virtual information processing apparatus). In this case, such a plurality of apparatuses may be communicably connected via a wired communication network, a wireless communication network, or any combination of both. Further, when such a plurality of apparatuses are virtual information processing apparatuses and the like, the communication network may be a virtual communication network.

The analysis system described in the following respective example embodiments may also be a system including all components of the system achieved by one apparatus one apparatus (for example, a physical information processing apparatus or a virtual information processing apparatus).

First Example Embodiment

Figure 1:
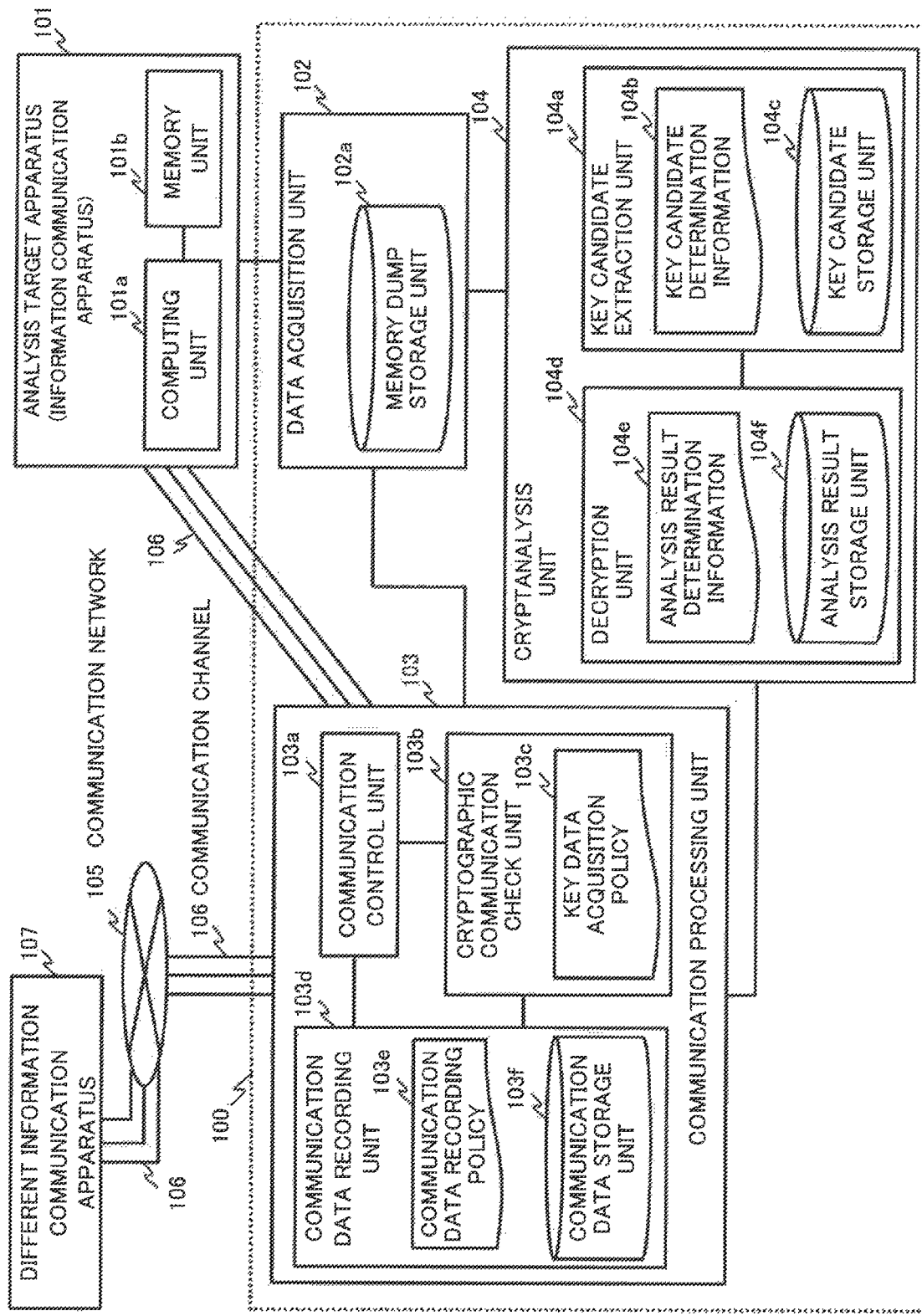
FIG. 1 is a block diagram illustrating a functional configuration of an analysis system, an analysis target, and the like according to a first example embodiment of the present invention.
Figure 2:
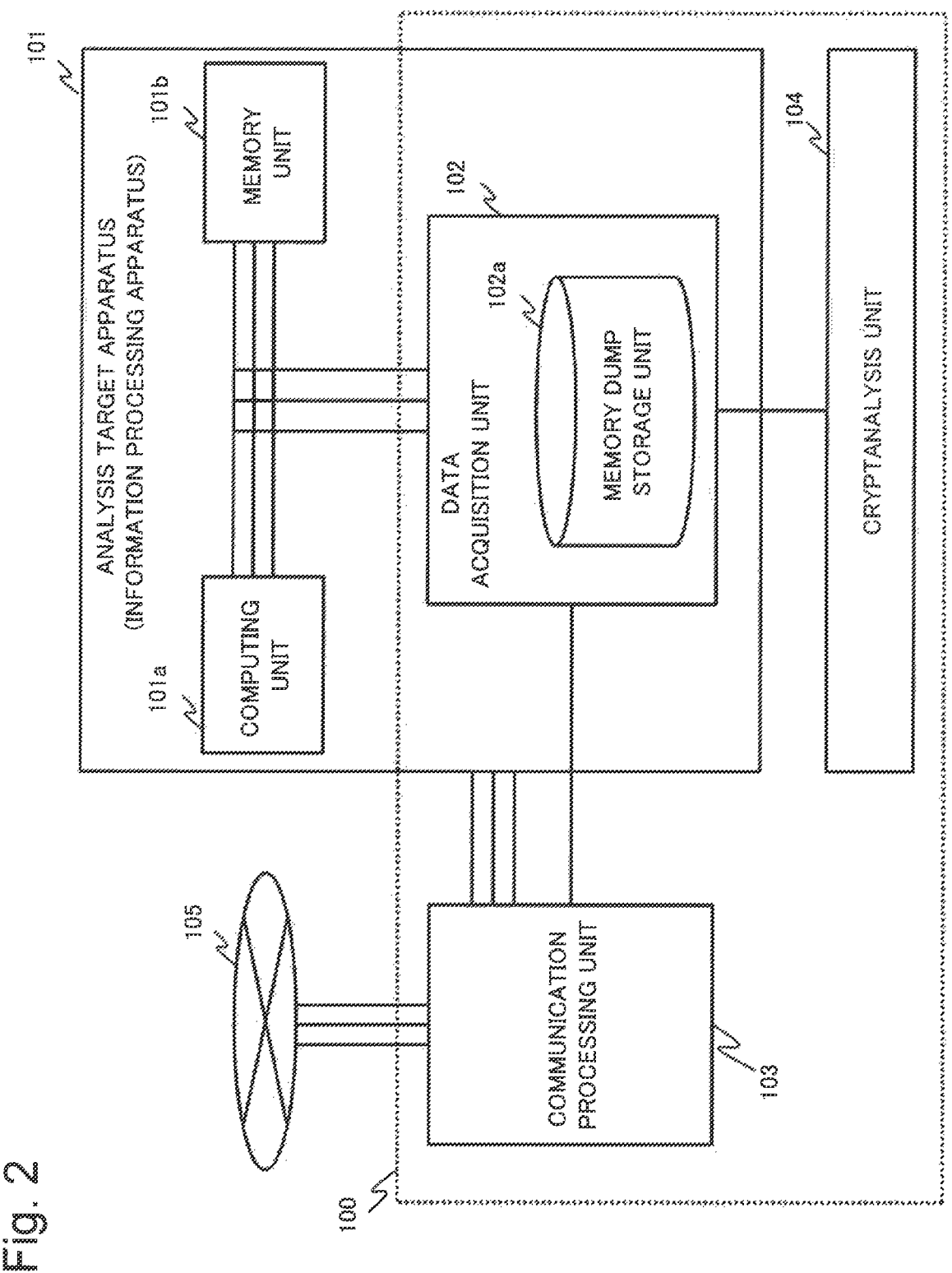
FIG. 2 is a diagram illustrating a configuration example capable of providing an analysis target apparatus and a data acquisition unit according to the first example embodiment.
Figure 3:
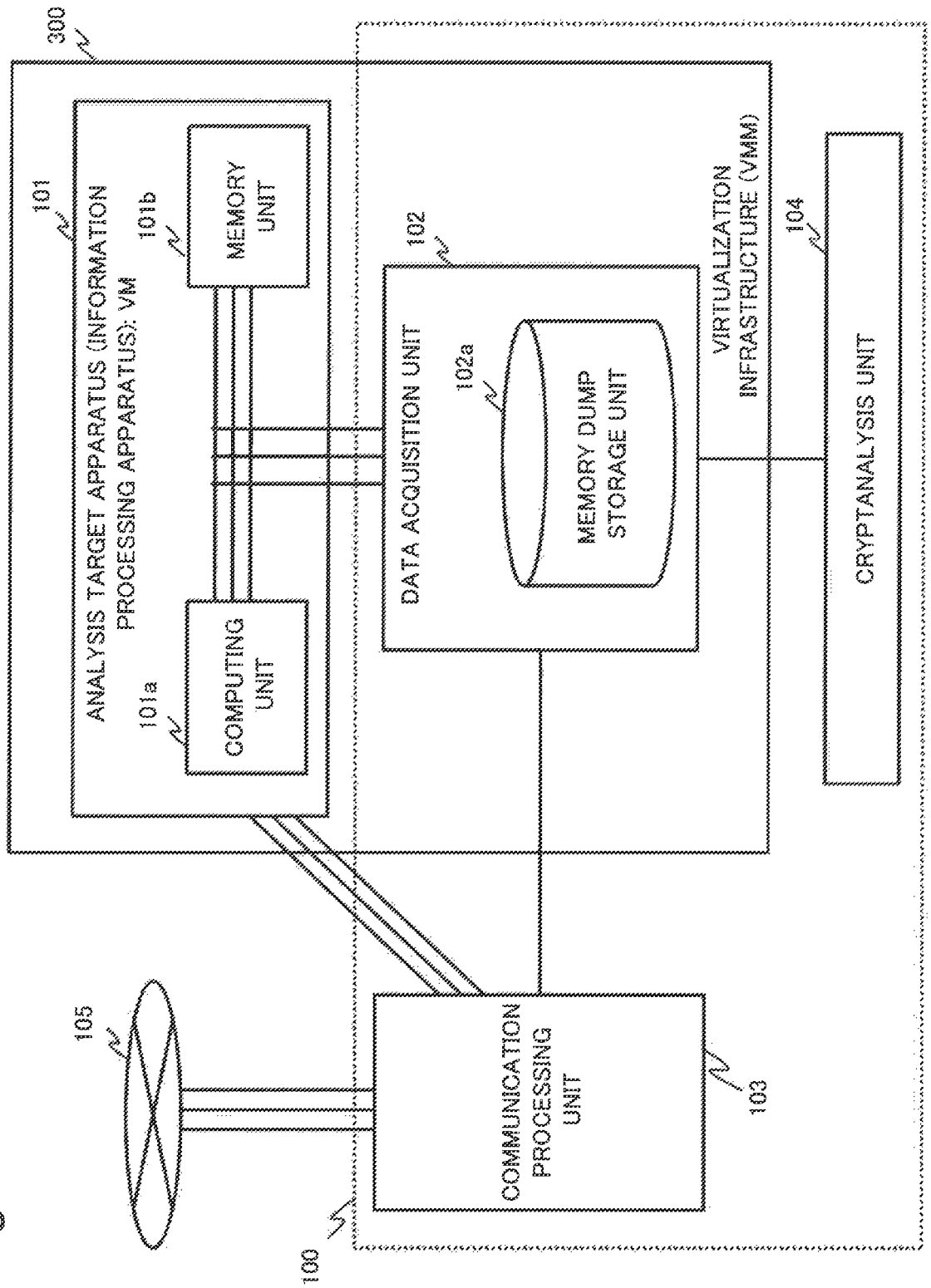
FIG. 3 is a diagram illustrating a configuration example capable of providing an analysis target apparatus and a data acquisition unit according to the first example embodiment.

A first example embodiment of the present invention will be described. First, an analysis system according to the present example embodiment will be described with reference to FIGS. 1 to 3. FIG. 1 is a block diagram illustrating a functional configuration of the analysis system 100 according to the present example embodiment. FIGS. 2 and 3 are diagrams illustrating configuration examples capable of providing an analysis target apparatus 101 and a data acquisition unit 102, according to the present example embodiment.

First, the analysis target apparatus 101 will be described. The analysis target apparatus 101 is an apparatus as an analysis target to be analyzed by the analysis system 100 according to the present example embodiment.

As exemplified in FIG. 1, the analysis target apparatus 101 according to the present example embodiment is any information communication apparatus including at least a computing unit 101*a* and a memory unit 101*b*, and being communicably connected to a communication network 105 through a communication channel 106.

For example, the analysis target apparatus 101 may be an information communication apparatus configured by physical hardware, such as a computer. The analysis target apparatus 101 may also be a virtual computer (virtual machine [VM]) or the like provided in a predetermined virtualization infrastructure capable of virtualizing various types of hardware such as an information processing apparatus.

For example, such a virtualization infrastructure may be provided in an environment built by use of a plurality of information processing apparatuses mutually connected by a communication network (for example, a cloud computing environment), or may be provided in an environment built by one information processing apparatus.

For example, such a virtualization infrastructure may be provided as a software program executed on a specific host operating system (OS), or may be provided as a software program implemented between hardware of an information processing apparatus and an OS.

Further, such a virtualization infrastructure may be provided by use of a function of a physical hardware apparatus, or may be provided by use of a combination of a function of a hardware apparatus (for example, various types of virtualization support functions of a central processing unit [CPU]) and a software program.

For example, Hyper-V provided by Microsoft (registered trademark) may be employed as such a virtualization infrastructure; however, such a virtualization infrastructure is not limited thereto.

The analysis target apparatus 101 is not limited to various types of computers and the like, and may be any equipment connectable to a communication network, such as a mobile phone (including a smartphone), a personal digital assistant (PDA), a game machine, tablet-type information equipment, a printer, a digital multifunction apparatus, and various types of network equipment (for example, a switch, a router, and an access point).

For example, the computing unit 101a is a computing apparatus, such as a central processing unit (CPU) and a micro-processing unit (MPU), that reads various types of data and programs (computer programs) stored in the memory unit 101b and executes various types of computing processing implemented in the program. The computing unit 101a may be a physical computing apparatus configured by a specific hardware (an integrated circuit). The computing unit 101a may also be a virtual computing apparatus (a virtual CPU) in a virtualization infrastructure virtualizing the hardware, as exemplified in FIG. 3.

For example, the memory unit 101b achieves functions of a main memory in the analysis target apparatus 101 and stores various types of programs, data, and the like processed in the computing unit 101a. Such a memory unit 101b may be a physical memory apparatus composed of specific hardware (for example, an integrated circuit), such as a dynamic random access memory (DRAM) composed of a dual inline memory module (DIMM). Further, the memory unit 101b may be a virtual memory apparatus provided in the aforementioned predetermined virtualization infrastructure.

Acquiring (dumping) data stored in the memory unit 101b (may be hereinafter referred to as "memory area data") from the outside unit is possible with regard to the memory unit 101b according to the present example embodiment. A specific method of memory-dumping can be achieved by a known appropriate technology. For example, the method may be a method of acquiring memory area data stored in non-transitory storage apparatus by use of a hibernation function of an operating system (OS). The method may be a method of acquiring memory area data paged out in a virtual storage achieved by an OS.

Memory area data is, for example, a part of data including data stored in a memory area specified based on a determination criteria of a key candidate or the like, as described in reference to FIG. 7, out of whole data stored in a memory or data stored in a memory.

Memory area data may be acquirable from communication data on a bus or the like connected between the computing unit 101a and the memory unit 101b when the memory unit 101b is configured with physical hardware. Further, memory area data may be acquirable by outputting (memory-dumping) data stored in an entire memory area of the memory unit 101b at a particular timing. In this case, for example, memory area data is acquirable with a function of a memory controller (not depicted) that controls reading, writing, accessing, or the like of data with respect to the memory unit 101b.

Data stored in the memory unit 101b is acquirable from data provided by a function (for example, a specific application programming interface [API]) of a virtualization infrastructure or by the virtualization infrastructure when the memory unit 101b is a virtual memory apparatus. The data provided by the virtualization infrastructure may be, for example, information for specifying a stored memory area in a virtual memory unit. A known technology may be employable for a specific implementation of such processing depending on a specific configuration of the virtualization infrastructure and, therefore, detailed description of the specific implementation will be omitted.

The analysis target apparatus 101 according to the present example embodiment executes cryptographic communication with the communication network 105 through the communication channel 106. More specifically, the analysis target apparatus 101 executes cryptographic communication with another information communication apparatus 107 communicably connected through the communication network 105.

In this case, a program executed on the analysis target apparatus 101 may provide cryptographic communication with another information communication apparatus 107. Such a program is not limited to a regular program executed on the analysis target apparatus 101. Such a program may include malware described above.

A cryptographic communication protocol such as SSL, SSH, or IPSec are employable as a cryptographic communication protocol encrypting a communication channel between the analysis target apparatus 101 and the communication network 105 (another information communication apparatus 107). A specific example of a case that SSL is employed as such a cryptographic communication protocol will be described in the respective example embodiments described below including the present example embodiment. The analysis system 100 according to the present example embodiment can be applied to not only SSL but also another cryptographic communication protocol.

SSL is an abbreviation of "Secure Sockets Layer". SSH is an abbreviation of "Secure Shell". IPSec is an abbreviation of "Security Architecture for Internet Protocol".

The communication network 105 is a communication network being configured by a wired communication network, a wireless communication network, or any combination of both and being capable of establishing a communication channel in accordance with any communication protocol. Such a communication network 105 may be a wide area communication network such as the Internet, an on-the-premises communication network such as a local area network (LAN), or a combination of both.

Further, a communication protocol used in the communication network 105 may be a known communication protocol such as Transmission Control Protocol/Internet Protocol (TCP/IP). For example, the communication network 105 is able to provide the analysis target apparatus 101 with a communication channel encrypted in accordance with respective cryptographic communication protocols. Such a communication network 105 can be configured by a known technology or a combination of known technologies, and therefore detailed description will be omitted.

Another information communication apparatus 107 is communicably connected to the analysis target apparatus 101 through the communication network 105. For example, another information communication apparatus 107 may be an information communication apparatus composed of physical hardware, such as a computer. Further, another information communication apparatus 107 may be a virtual computer and the like provided in a predetermined virtualization infrastructure.

Another information communication apparatus 107 is not limited to various types of computers and the like. Another information communication apparatus 107 may be a mobile phone (including a smartphone), a PDA, a game machine, tablet-type information equipment, a printer, a digital multifunction apparatus, various types of network equipment, and any equipment connectable to a communication network.

For example, another information communication apparatus 107 executes cryptographic communication with the analysis target apparatus 101 in accordance with a cryptographic communication protocol as exemplified above. Such another information communication apparatus 107 can be configured by a known technology or a combination of known technologies, and therefore detailed description will be omitted.

(Configuration of Analysis System 100)

Next, components of the analysis system 100 according to the present example embodiment will be described.

The analysis system 100 according to the present example embodiment mainly includes the data acquisition unit 102, a cryptanalysis unit 104, and a communication processing unit 103. Hereinafter, the data acquisition unit 102, the cryptanalysis unit 104, the communication processing unit 103, and components constituting the units may be simply refer to as "components of the analysis system 100".

The analysis system 100 according to the present example embodiment analyzes cryptographic communication between the analysis target apparatus 101 and another information communication apparatus 107 connected through the communication network 105 by use of the above-described components. Then, the analysis system 100 according to the present example embodiment executes specific processing based on the analysis result.

Each component of the analysis system 100 may be provided by an information processing apparatus such as a physical computer, or may be provided by a VM provided in a virtualization infrastructure. The respective components of the analysis system 100 are communicably connected via a wireless communication line, a wired communication line, or any combination of both. Such a communication line may employ a known technology, and therefore detailed description will be omitted. Each component of the analysis system 100 will be described below.

The data acquisition unit 102 and the communication processing unit 103, respectively described below, are one of main components of the present invention in a case that the present example embodiment is described as a specific example.

(Configuration of Data Acquisition Unit 102)

First, the data acquisition unit 102 according to the present example embodiment will be described. The data acquisition unit 102 according to the present example embodiment is communicably connected to the analysis target apparatus 101. The data acquisition unit 102 acquires memory area data stored in the memory unit 101b in the analysis target apparatus 101. The data acquisition unit 102 includes a memory dump storage unit 102a that stores the acquired memory area data.

The data acquisition unit 102 may be provided as an extended hardware apparatus connected to the memory unit 101b through various types of communication buses or the like, as exemplified in FIG. 2, when the analysis target apparatus 101 is implemented by use of an information communication apparatus such as a physical computer, for example. The data acquisition unit 102 may also be connected to a memory controller (not depicted) that controls read, write, access, and the like of data with respect to the memory unit 101b. In this case, for example, the data acquisition unit 102 may acquire data stored in the memory unit 101b through the memory controller (not depicted) that controls read and write of data with respect to the memory unit 101b. Reference 1 below discloses a technology of acquiring a content of a memory apparatus (synchronous dynamic random access memory [SDRAM]) implemented on a computer, by extended hardware connected to a Peripheral Components Interconnect (PCI) bus.

REFERENCE 1

Brian D. Carrier, Joe Grand, "A hardware-based memory acquisition procedure for digital investigations," Digital Investigation Volume 1, Issue 1, February 2004, pp. 50 to 60

It is assumed that analysis target apparatus 101 is achieved by a VM or the like provided by a virtualization infrastructure. In this case, for example, the data acquisition unit 102 may be achieved by a function of a virtual machine monitor (VMM) 300 provided in the virtualization infrastructure. The virtual machine monitor 300 is a software capable of controlling an operation of a VM, as exemplified in FIG. 3. More specifically, the data acquisition unit 102 may be achieved by software (a software program) or a virtual apparatus, utilizing a function of the VMM 300.

In this case, as described above, the data acquisition unit 102 is able to acquire (dump) data stored in the memory unit 101b through a function (for example, a specific API) and data (for example, information for specifying a memory area of data stored in the virtual memory unit 101b) respectively provided by the VMM. A known technology may be appropriately employed depending on a configuration of the memory unit 101b as a specific method of acquiring memory area data.

Further, without being limited to aforementioned FIGS. 2 and 3, for example, the data acquisition unit 102 may be provided by incorporating a memory dump function by hardware, software, or a combination of hardware and software into the analysis target apparatus 101 itself. In this case, for example, the data acquisition unit 102 may be provided as any software executed in the analysis target apparatus. The data acquisition unit 102 itself does not execute analysis processing of malware or communication by malware. Therefore, risk of being detected by malware is relatively low.

For example, the data acquisition unit 102 receives a dump command for acquiring memory area data stored in the memory unit 101b from the communication processing unit 103 (a cryptographic communication check unit 103b in particular) to be described later. The data acquisition unit 102 dumps memory area data stored in the memory unit 101b at a timing of receiving the dump command.

The data acquisition unit 102 may dump whole memory area data (for example, data stored in the entire memory area in the memory unit 101b) stored in the memory unit 101b. The data acquisition unit 102 may also dump at least part of memory area data out of data stored in the memory unit 101b.

The data acquisition unit 102 stores (registers) dumped memory area data into a memory dump storage unit 102a to be described later.

When processing of dumping memory area data from the memory unit 101b is completed, the data acquisition unit 102 may notify completion of the processing to the communication processing unit 103 (the cryptographic communication check unit 103b in particular) to be described later.

The memory dump storage unit 102a keeps memory area data acquired by the data acquisition unit 102. The memory dump storage unit 102a may store memory area data acquired from the memory unit 101*b* and information indicating a timing of acquisition of the memory area data, in association with each other.

(Configuration of Communication Processing Unit 103)

Next, the communication processing unit 103 according to the present example embodiment will be described. First, an overview of the communication processing unit 103 according to the present example embodiment will be described.

The communication processing unit 103 is arranged between the analysis target apparatus 101 and the communication network 105, and is communicably connected to each of them through the communication channel 106. The communication processing unit 103 relays communication data between the analysis target apparatus 101 and the communication network 105 in accordance with an analysis result of communication data communicated between the analysis target apparatus 101 and the communication network 105. In particular, the communication processing unit 103 according to the present example embodiment is able to relay communication data related to cryptographic communication in accordance with a predetermined cryptographic communication protocol between the analysis target apparatus 101 and the communication network 105.

The communication processing unit 103 instructs the data acquisition unit 102 to acquire memory area data stored in the memory unit 101*b* in the analysis target apparatus 101, in accordance with the analysis result of the communication data. In this case, the communication processing unit 103 may control temporal suspending and resuming of communication between the analysis target apparatus 101 and the communication network 105.

The communication processing unit 103 stores the communication data in accordance with the analysis result of the communication data.

For example, the communication processing unit 103 may be network equipment, such as a router, a switch, or an access point, that includes a communication interface connected to a plurality of communication channels 106. In addition, the communication processing unit 103 may be an information processing apparatus which is able to provide a function of the network equipment, such as a computer. Such a communication processing unit 103 may be implemented as physical network equipment or a physical information processing apparatus. Such a communication processing unit 103 may also be provided as a virtual apparatus such as a virtual network equipment or a virtual information processing apparatus in a specific virtualization infrastructure.

A specific configuration of the communication processing unit 103 will be described below.

The communication processing unit 103 includes a communication control unit 103*a* and the cryptographic communication check unit 103*b* as exemplified in FIG. 1. The communication processing unit 103 may include a communication data recording unit 103*d*. The communication control unit 103*a*, the cryptographic communication check unit 103*b*, and the communication data recording unit 103*d* are communicably connected with one another.

Each component of the communication processing unit 103 will be described below.

As described above, the communication control unit 103*a* relays communication between the analysis target apparatus 101 and the communication network 105. More specifically, the communication control unit 103*a* relays communication between the analysis target apparatus 101 and another information communication apparatus 107 connected through the communication network 105. It is hereinafter assumed that communication between the analysis target apparatus 101 and the communication network 105 includes communication between the analysis target apparatus 101 and another information communication apparatus 107 connected through the communication network 105. Communication between the analysis target apparatus 101 and the communication network 105 may be encrypted in accordance with a specific cryptographic communication protocol (for example, SSL).

The communication control unit 103*a* captures communication data transmitted from the analysis target apparatus 101 and analyzes a communication content of the communication data (for example, destination information or information about a communication protocol). The communication control unit 103*a* captures communication data received from the communication network 105 and analyzes a content thereof (for example, destination information or information about a communication protocol). The communication control unit 103*a* transfers each piece of communication data between the communication network 105 and the analysis target apparatus 101 in accordance with the analysis results.

As an example, it is assumed that the communication network 105 is a network employing the Internet Protocol (IP) (IP network) such as the Internet. In this case, by analyzing IP packets constituting communication data, the communication control unit 103*a* is able to transfer the communication data between the communication network 105 and the analysis target apparatus 101. Such transfer control of communication data is achievable by a technology similar to a known network equipment such as a router and a switch, and therefore detailed description will be omitted.

The communication control unit 103*a* is able to temporally suspend communication between the analysis target apparatus 101 and the communication network 105 and is also able to resume the suspended communication. More specifically, the communication control unit 103*a* is able to control suspending and resuming of communication between the analysis target apparatus 101 and another information communication apparatus 107 connected through the communication network 105.

For example, the communication control unit 103*a* controls suspending and resuming of writing (or reading) communication data with respect to a not depicted network interface connected to the communication channel 106 connected to the communication network 105 or the analysis target apparatus 101. Consequently, the communication control unit 103*a* is able to control communication between the analysis target apparatus 101 and the communication network 105. As for the control technology of writing (or reading) communication data with respect to a network interface, a known technology may be appropriately employed depending on a specific configuration of the network interface or the communication processing unit 103, and therefore detailed description will be omitted.

The communication control unit 103*a* may temporally suspend communication between the analysis target apparatus 101 and the communication network 105 in accordance with a request from the cryptographic communication check unit 103*b* to be described later. Similarly, the communication control unit 103*a* may resume the suspended communication in accordance with a request from the cryptographic communication check unit 103*b* to be described later.

The communication control unit 103*a* provides (delivers) the captured communication data to the cryptographic communication check unit 103*b* to be described later. Similarly, the communication control unit 103a may provide (deliver) the captured communication data to the communication data recording unit 103d to be described later.

Next, the cryptographic communication check unit 103b will be described.

The cryptographic communication check unit 103b analyzes communication data received from the communication control unit 103a. The cryptographic communication check unit 103b determines a timing at which the memory unit 101b in the analysis target apparatus 101 is storing data including confidential information used for encryption of a communication channel in accordance with the cryptographic communication protocol, on the basis of the analysis result and a key data acquisition policy 103c to be described later.

Such data including confidential information are generally data (may be hereinafter referred to as "key data") including a key (may be hereinafter referred to as an "encryption key") used for encryption of a communication channel. Such an encryption key is a key which can be used to encrypt or decode (decrypt) communication data communicated in an encrypted communication channel.

In other words, the cryptographic communication check unit 103b analyzes communication data with a specific cryptographic communication protocol and determines whether or not key data including an encryption key are being stored in the memory unit 101b in the analysis target apparatus 101. More specifically, the cryptographic communication check unit 103b may analyze the communication data and determine a timing at which the memory unit 101b in the analysis target apparatus 101 is storing the key data.

For example, a procedure progress state of exchanging an encryption key used for encryption of a communication channel can be checked by analyzing communication data in a cryptographic communication protocol such as SSL/TLS or so like. TLS is an abbreviation of "Transport Layer Security".

Specifically, in a cryptographic communication protocol such as SSL/TLS, an encryption key itself (or information from which an encryption key can be derived) exchanged between two or more communication terminals is protected (encrypted) by use of a technology such as a public key infrastructure (PKI). Accordingly, the third party has a difficulty in acquisition of the encryption key itself (or the information from which the encryption key can be derived) through the communication channel.

However, the cryptographic communication check unit 103b analyzes an unencrypted part in communication data and is able to check information indicating progress state of an exchange procedure of an encryption key in the cryptographic communication protocol. For example, when the cryptographic communication protocol is SSL, a header (Record header) in the Record protocol and part of messages in the handshake protocol are not encrypted in communication data. Accordingly, for example, the cryptographic communication check unit 103b analyzes the part in communication data and is able to check progress state of exchanging procedure of an encryption key in the SSL protocol.

For example, in the SSL protocol, an encryption key for a communication channel is shared by two communication terminals when a predetermined procedure is executed (specifically, when a ChangeCipherSpec message is communicated). In other words, it is highly likely that a memory unit in the communication terminal (for example, the analysis target apparatus 101) stores key data including such an encryption key at the timing of sharing such an encryption key. Consequently, the cryptographic communication check unit 103b analyzes communication data in accordance with a specific cryptographic communication protocol and is able to determine a timing at which the memory unit 101b in the analysis target apparatus 101 is storing key data including an encryption key.

Further, the cryptographic communication check unit 103b may acquire various types of information (may be hereinafter referred to as a "cipher suite") used for encryption processing in the communication from a message in handshake processing that establishes a communication connection via a communication network. For example, such a cipher suite includes information indicating an encryption algorithm, a key length of an encryption key, a cipher mode of operation (to be described later), and a message authentication scheme of communication data. For example, when the cryptographic communication protocol is the SSL protocol, the cryptographic communication check unit 103b acquires an encryption algorithm and the like for encryption of a target information from a ClientHello message and a ServerHello message communicated in the handshake processing.

The cryptographic communication check unit 103b may analyze communication data and acquire various types of information (may be hereinafter referred to as a "cipher suite") used for encryption processing of a communication channel in accordance with the cryptographic communication protocol. Such cipher suite includes information indicating an encryption algorithm, a key length of an encryption key, a cipher mode of operation (to be described later), and a message authentication scheme of communication data. For example, when the cryptographic communication protocol is the SSL protocol, the cryptographic communication check unit 103b analyzes a ClientHello message and a ServerHello message and acquires an encryption algorithm for encryption of a communication channel and the like.

Known technologies in the SSL protocol are, for example, the handshake protocol, various types of messages, or the like used and, therefore, detailed description of them will be omitted.

As described above, the cryptographic communication check unit 103b checks progress state of the exchanging procedure of an encryption key between the analysis target apparatus 101 and another information communication apparatus 107. Thus, the cryptographic communication check unit 103b determines a timing at which the memory unit 101b in the analysis target apparatus 101 is storing key data including the encryption key. More specifically, the cryptographic communication check unit 103b determines a timing at which the memory unit 101b in the analysis target apparatus 101 is storing key data including the encryption key by use of information set to the key data acquisition policy 103c.

Figure 4:
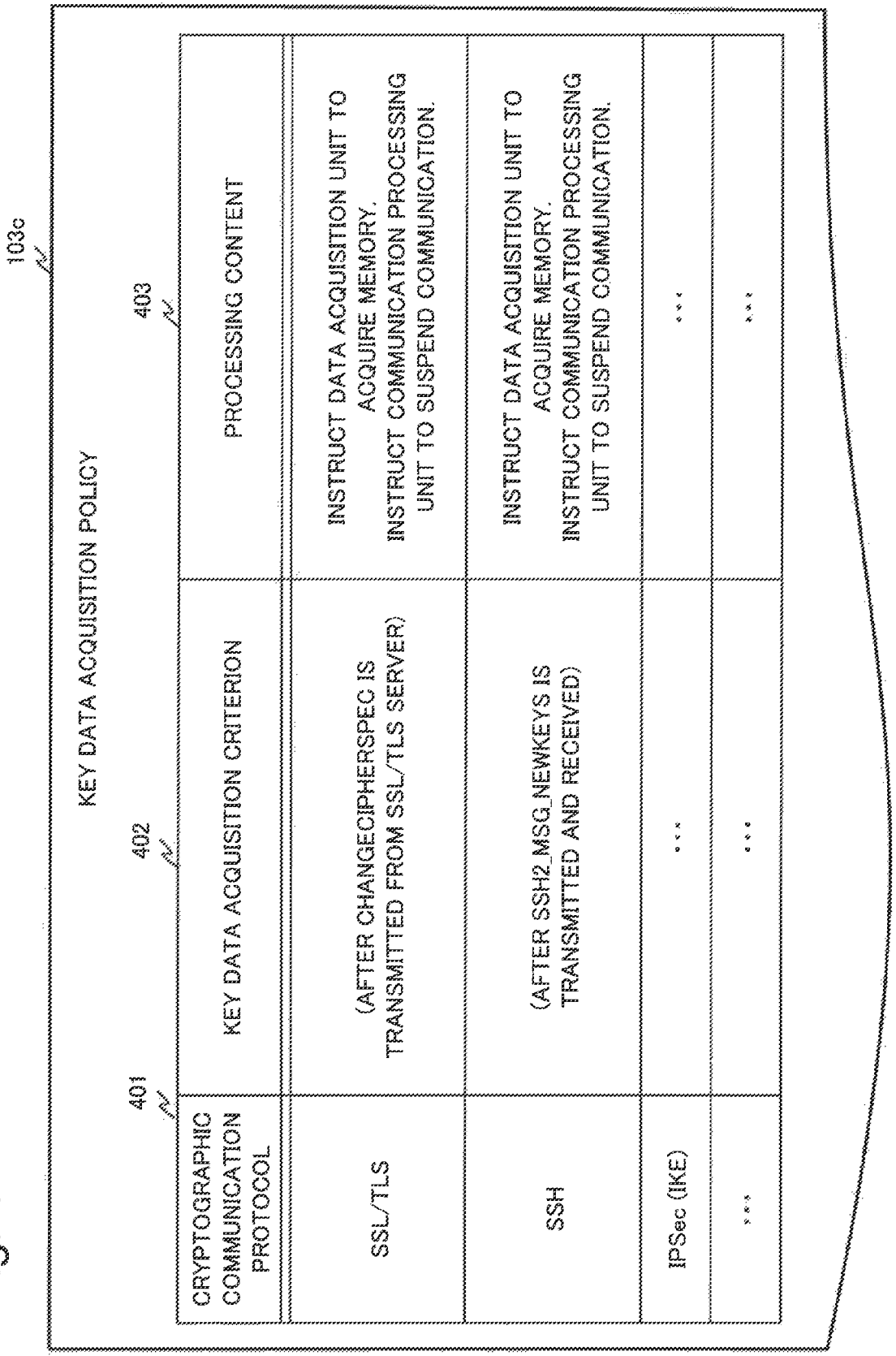
FIG. 4 is a diagram illustrating an example of key data acquisition policy according to the first example embodiment.

As exemplified in FIG. 4, the key data acquisition policy 103c includes a type of a specific cryptographic communication protocol (401 in FIG. 4) and a key data acquisition criterion (402 in FIG. 4). The key data acquisition criterion 402 is associated with the cryptographic communication protocol 401. The key data acquisition criterion 402 is information indicating a criterion for determining at least a timing at which the memory unit 101b in the analysis target apparatus 101 is storing the key data.

Further, the key data acquisition policy 103c may additionally include a content of processing (403 in FIG. 4) executed by the cryptographic communication check unit 103b. The processing content 403 is associated with the cryptographic communication protocol 401 in the key data acquisition policy 103c. The processing content 403 is information indicating a content of processing executed by the cryptographic communication check unit 103b when the key data are determined to be stored in the memory unit 101b in the analysis target apparatus 101, in accordance with the key data acquisition criterion 402.

For example, the cryptographic communication protocol 401 may be set with an identifier (ID) identifying the cryptographic communication protocol for each specific cryptographic communication protocol.

For example, the key data acquisition criterion 402 may include information described in accordance with any machine interpretable form (format) by information processing apparatus (computer) and the like and the information is for determining the specific timing. The machine interpretable form may be arbitrarily determined, and, for example, may be a combination of specific symbols, an expression by a structured language, or the like. Any machine interpretable format is not limited to the above-described examples.

For example, the processing content 403 may include information indicating a content of processing executed by the cryptographic communication check unit 103b. The information is described in any machine interpretable form (format).

For example, when the cryptographic communication protocol is "SSL/TLS" as exemplified in FIG. 4, the key data acquisition criterion 402 includes information representing a timing being "(after ChangeCipherSpec is transmitted from SSL/TLS server) and (before transmission and reception of Application Data start)". When analyzing communication data and determining that the key data acquisition criterion 402 is satisfied, the cryptographic communication check unit 103b executes processing registered in the processing content 403.

"ChangeCipherSpec" is a message that a cryptographic communication in accordance with a cryptographic method (the cryptographic communication protocol 401) is started. "SSH2_MSG_NEWKEYS" is, for example, a message representing that communication for a key data has been completed. When a cryptographic communication protocol is "SSL/TLS", the above-described key data acquisition criterion 402 may be a period from "After transmitting ChangeCipherSpec from SSL/TLS Server" to "Before starting communication of Application Data" and is not limited to the above-described examples.

For example, the key data acquisition criterion 402 may include information about a timing at which a specific condition related to an encryption key in a cryptographic communication protocol is satisfied. More specifically, the key data acquisition criterion 402 may include information about a timing at which an encryption key is shared between the analysis target apparatus 101 and another information communication apparatus 107 in the specific cryptographic communication protocol 401. The key data acquisition criterion 402 may also include information about a timing at which specific procedure related to sharing of an encryption key is executed between the analysis target apparatus 101 and another information communication apparatus 107 in the specific cryptographic communication protocol.

The above-described key data acquisition policy 103c may be preset to the cryptographic communication check unit 103b by any technique.

The cryptographic communication check unit 103b refers to the key data acquisition policy 103c (the key data acquisition criterion 402 in particular) and determines whether or not key data including an encryption key is being stored in the memory unit 101b in the analysis target apparatus 101. When determining that key data including an encryption key is being stored in the memory unit 101b, the cryptographic communication check unit 103b may instruct the data acquisition unit 102 to acquire memory area data.

That is, the cryptographic communication check unit 103b analyzes communication data and determines a timing at which the memory unit 101b in the analysis target apparatus 101 is storing key data including an encryption key, in accordance with the key data acquisition policy 103c. It is highly likely that the memory unit 101b is storing an encryption key at the timing. Accordingly, at the timing, the cryptographic communication check unit 103b instructs the data acquisition unit 102 to acquire memory area data. In this case, it is highly likely that the memory area data acquired by the data acquisition unit 102 is storing the encryption key.

Further, when determining that the memory unit 101b in the analysis target apparatus 101 is storing the key data, the cryptographic communication check unit 103b is able to instruct the communication control unit 103a to (at least temporarily) suspend communication between the analysis target apparatus 101 and the communication network 105.

It is assumed that communication between the analysis target apparatus 101 and the communication network 105 continues without being suspended. In this case, the key data may be lost from the memory unit 101b in the analysis target apparatus 101. Further, when the communication continues without being suspended, the encryption key used for encryption of the communication channel may be changed depending on the communication protocol.

Accordingly, the cryptographic communication check unit 103b instructs the communication control unit 103a to suspend communication between the analysis target apparatus 101 and the communication network 105 at a timing of determining that the memory unit 101b is storing the key. It is expected that the memory unit 101b is storing the encryption key while the communication is suspended. Accordingly, it is expected that memory area data acquired by the data acquisition unit 102 during this period includes the key data.

In other words, the cryptographic communication check unit 103b may suspend such communication and, thereby, extend a period (time) in which the memory unit 101b is storing the encryption key. The cryptographic communication check unit 103b suspends the communication between the analysis target apparatus 101 and the communication network 105 at a timing when the memory unit 101b is storing the key data, acquires memory area, and, can, thereby, acquire memory area data highly likely including the key data.

The cryptographic communication check unit 103b may instruct the communication control unit 103a to resume communication when the data acquisition unit 102 notifies completion of acquisition processing of the memory area data while the communication between the analysis target apparatus 101 and the communication network 105 is suspended.

The cryptographic communication check unit 103b may appropriately select a timing at which communication between the analysis target apparatus 101 and the communication network 105 is resumed. Specifically, the cryptographic communication check unit 103b may resume the communication when the data acquisition unit 102 notifies completion of acquisition of memory area data. Further, for example, the cryptographic communication check unit 103b may resume the communication when the cryptanalysis unit 104 (to be described later) notifies completion of decryption of communication data. The cryptographic communication check unit 103b controls a resumption timing of the communication as described above and, thereby, is able to minimize a time (period) during suspension of the communication.

For example, when a suspension period of the communication is prolonged, a program executing communication processing in the analysis target apparatus may regard the prolongation as a communication error or the like, and processing by the program may be abnormally terminated. When such a program is malware and processing by the malware is terminated, behavior analysis of the program becomes difficult, in particular. On the contrary, minimizing a time (period) for suspending the communication, for example, enables the behavior analysis of the malware while allowing the malware to continue processing.

The cryptographic communication check unit 103b may instruct resuming of communication between the analysis target apparatus 101 and the communication network 105 when a specific time (for example, 30 seconds) elapses after instructing suspension of the communication between the analysis target apparatus 101 and the communication network 105 to the aforementioned communication control unit 103a. The cryptographic communication check unit 103b may appropriately select an appropriate value as the specific time. For example, when the data acquisition unit 102, in advance, calculates a time necessary for acquiring memory area data from the memory unit 101b through a preliminary experiment and a simulation, the cryptographic communication check unit 103b is able to select a minimum value as the specific time.

Additionally, when the data acquisition unit 102 notifies completion of acquisition processing of memory area data, the cryptographic communication check unit 103b may instruct the cryptanalysis unit 104 (to be described later) to decrypt communication data stored in the communication data recording unit 103d (to be described later). Further, at that time, the cryptographic communication check unit 103b may notify the cryptanalysis unit 104 of information about an encryption algorithm used in the aforementioned cryptographic communication protocol. Detailed processing related to decryption of communication data will be described later.

The cryptographic communication check unit 103b may receive notification indicating decryption processing completion of communication data from the cryptanalysis unit 104 (a decryption unit 104d in particular) to be described later. At that time, when communication between the analysis target apparatus 101 and the communication network 105 is suspended, the cryptographic communication check unit 103b may instruct the communication control unit 103a to resume the suspended communication.

The cryptographic communication check unit 103b checks (analyzes) communication data decrypted by the cryptanalysis unit 104 and executes specific processing in accordance with the analysis result. The cryptographic communication check unit 103b may appropriately select such specific processing.

For example, the cryptographic communication check unit 103b may instruct the communication control unit 103a to suspend communication between the analysis target apparatus 101 and the communication network 105 as such specific processing. Further, for example, the cryptographic communication check unit 103b may change data communicated between the analysis target apparatus 101 and the communication network 105 as such specific processing. Further, for example, the cryptographic communication check unit 103b may continue communication between the analysis target apparatus 101 and the communication network 105 as-is, so as not to be sensed by malware and the like. Such specific processing may be predetermined depending on decrypted communication data.

Next, the communication data recording unit 103d will be described.

The communication data recording unit 103d stores (registers) the communication data captured by the communication control unit 103a into a communication data storage unit 103f in accordance with a communication data recording policy 103e.

The communication data recording policy 103e is information for determining whether or not communication data captured by the communication control unit 103a need to be stored.

Figure 5:
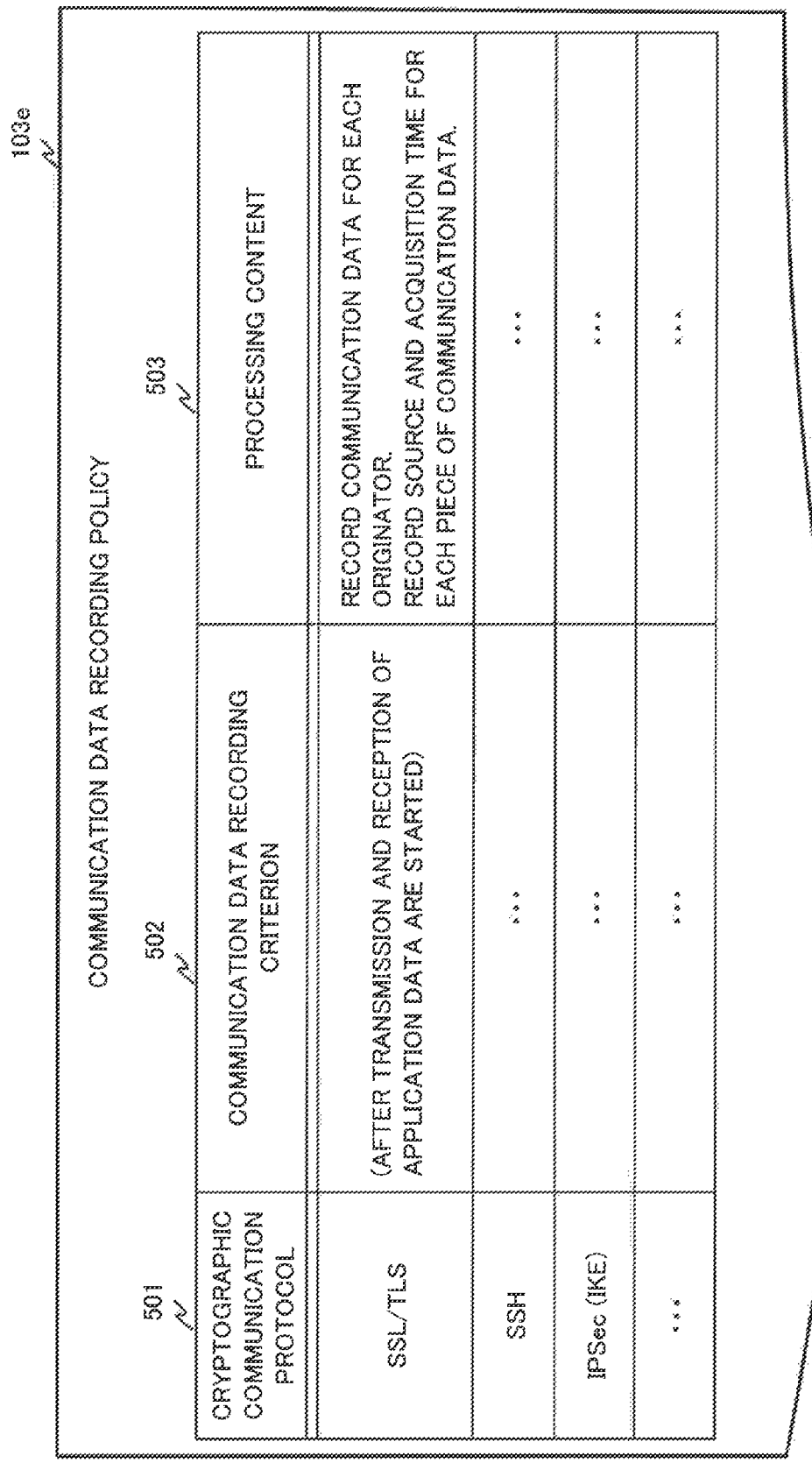
FIG. 5 is a diagram illustrating an example of communication data recording policy according to the first example embodiment.

More specifically, as exemplified in FIG. 5, the communication data recording policy 103e includes a type of a specific cryptographic communication protocol (501 in FIG. 5) and a communication data recording criterion (502 in FIG. 5). The communication data recording criterion 502 is associated with the cryptographic communication protocol 501. The communication data recording criterion 502 is a criterion (information) for determining whether or not communication data in accordance with the cryptographic communication protocol 501 need to be stored (recorded).

Further, the communication data recording policy 103e may additionally include a content of processing (503 in FIG. 5) executed by the communication data recording unit 103d. Such a processing content 503 is associated with the cryptographic communication protocol 501. The processing content 503 is information indicating a content of processing executed by the communication data recording unit 103d when the communication data recording criterion 502 is determined to be satisfied.

For example, the cryptographic communication protocol 501 may include an identifier (ID) for identifying a cryptographic communication protocol for each specific cryptographic communication protocol.

For example, the communication data recording criterion 502 may include registration information that is described in accordance with any machine interpretable form (format) and is for determining whether or not communication data need to be stored (recorded). More specifically, for example, the communication data recording criterion 502 may include registration information for determining whether or not a condition for storing communication data is satisfied, or registration information for determining a timing of storing communication data.

For example, the processing content 503 may include registration information that is described in accordance with any machine interpretable form (format) and indicates a content of processing executed by the communication data recording unit 103d.

For example, when the cryptographic communication protocol is "SSL/TLS" as exemplified in FIG. 5, the communication data recording criterion 502 includes information representing "(after transmission and reception of Application Data are started)" beforehand. When determining that the communication data recording criterion 502 is satisfied as a result of analyzing communication data, the communication data recording unit 103d executes processing registered in the processing content 503.

For example, the communication data recording criterion 502 may include a condition indicating that data are recorded at or after a timing when the first (encrypted)

communication data are communicated on a communication channel encrypted by the cryptographic communication protocol 501.

As described above, the encryption key used for encryption of a communication channel may be changed at a predetermined timing in a certain cryptographic communication protocol. In other words, the encryption key for encrypting the communication channel may be changed between the first communication data in an encrypted communication channel and the second and subsequent communication data in the encrypted communication channel. Further, in another cryptographic communication protocol, highly confidential information (highly important information) may be communicated in the first communication data after the communication channel is encrypted. Accordingly, when the communication channel is encrypted, it is effective to store the communication data at a timing when the first communication data are communicated so that the cryptanalysis unit 104 (to be described later) is able to decrypt all cryptographic communication data.

Without being limited to the above, the communication data recording criterion 502 may include information for determining any timing.

The communication data recording policy 103e described above may be preset to the communication data recording unit 103d by any technique.

The communication data recording unit 103d registers communication data determined to satisfy the communication data recording criterion 502 to the communication data storage unit 103f.

Figure 6:
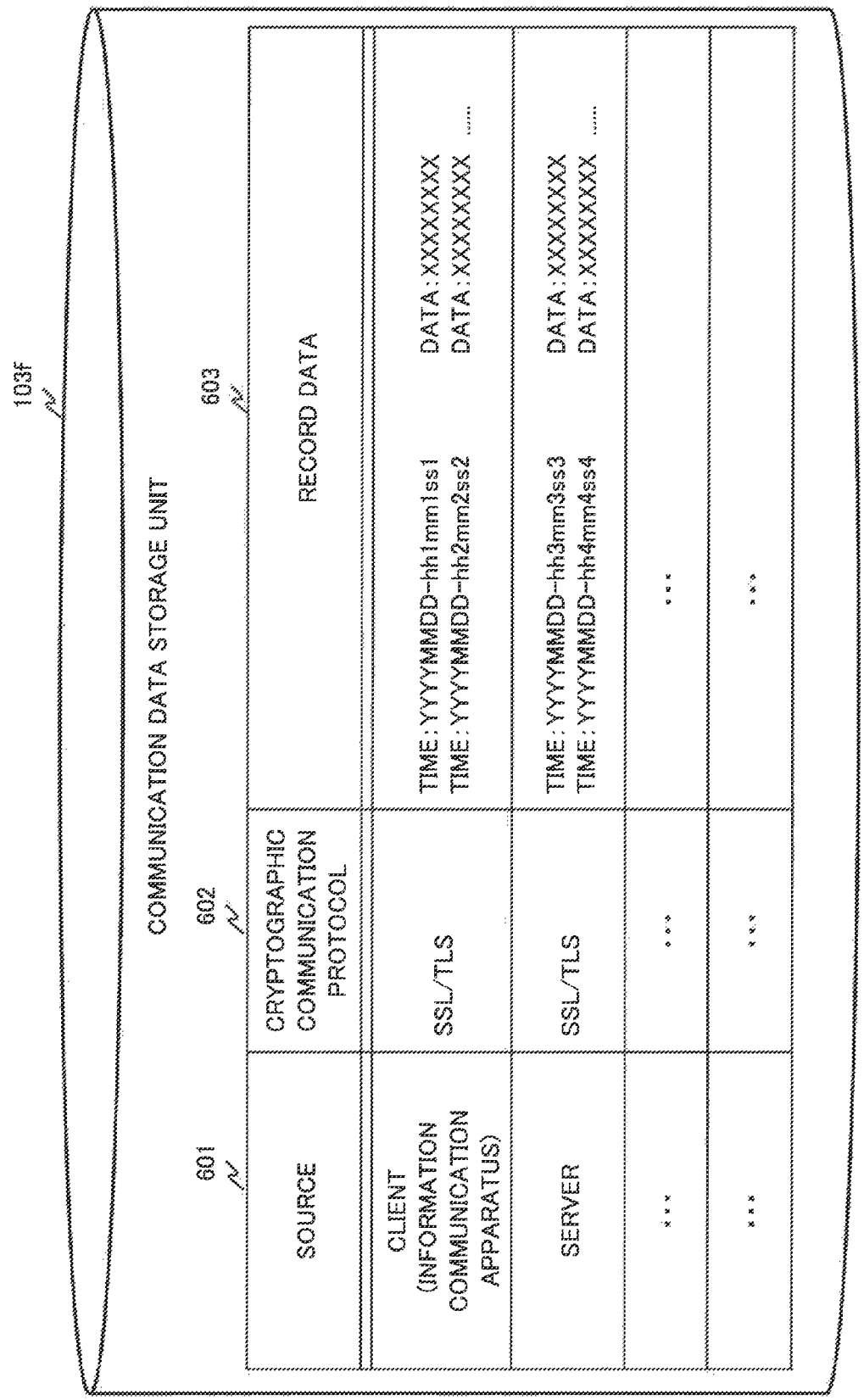
FIG. 6 is a diagram illustrating an example of a communication data storage unit according to the first example embodiment.

For example, as exemplified in FIG. 6, the communication data storage unit 103f stores information about the communication source (601 in FIG. 6), identification information indicating the cryptographic communication protocol (602 in FIG. 6), and record data indicating the recorded communication data (603 in FIG. 6) in association with each other for each piece of communication data. The record data 603 may include information indicating a timing such as the capture time of the communication data, and the content of the communication data.

(Configuration of Cryptanalysis Unit 104)

Next, the cryptanalysis unit 104 according to the present example embodiment will be described. First, an overview of the cryptanalysis unit 104 according to the present example embodiment will be described.

The cryptanalysis unit 104 analyzes memory area data acquired by the aforementioned data acquisition unit 102, and extracts candidates of the aforementioned encryption key included in the memory area data, in accordance with information indicating a feature of key data (to be described later).

The cryptanalysis unit 104 extracts a true encryption key out of the encryption key candidates based on a result of decoding encrypted communication data stored by the communication data recording unit 103d by use of the extracted encryption key candidates. In this case, the true encryption key is a key that can correctly decode encrypted communication data. At this time, the cryptanalysis unit 104 may specify an encryption scheme (encryption algorithm) used in the aforementioned cryptographic communication protocol.

A specific configuration of the cryptanalysis unit 104 will be described below.

The cryptanalysis unit 104 includes a key candidate extraction unit 104a and the decryption unit 104d. These components in the cryptanalysis unit 104 are communicably connected to one another.

First, the key candidate extraction unit 104a according to the present example embodiment will be described. The key candidate extraction unit 104a includes a key candidate determination information 104b and a key candidate storage unit 104c.

The key candidate extraction unit 104a refers to memory area data registered in the memory dump storage unit 102a and extracts candidates of the aforementioned encryption key from the memory area data in accordance with the key candidate determination information 104b. Specifically, the key candidate extraction unit 104a extracts candidates of key data including encryption key candidates used in cryptographic communication between the analysis target apparatus 101 and the communication network 105 from the memory area data, in accordance with the key candidate determination information 104b. The candidates of key data may be hereinafter referred to as "key data candidates." When extracting key data candidates, the key candidate extraction unit 104a may notify completion of the processing to the decryption unit 104d to be described later.

First, search processing of the aforementioned encryption key in the aforementioned memory area data by the key candidate extraction unit 104a will be described.

As described above, memory area data are data stored in the memory unit 101b in the analysis target apparatus 101 at a specific timing. In other words, a content of memory area data changes depending on a timing at which the data acquisition unit 102 acquires the memory area data from the memory unit 101b. Accordingly, it is difficult to specify key data including the encryption key in the memory area data, in advance.

Further, when storage capacity (a size of a memory space) of the memory unit 101b in the analysis target apparatus 101 is large, a size of memory area data is also large. That is to say, the key candidate extraction unit 104a needs to search for an encryption key in a huge size of data. Assuming that a 128-bit encryption key is fully searched for in 1-gigabyte (GB) memory area data, a number of candidates is enormous, and therefore extraction processing of a key data candidates is required to be efficient.

Key data including the encryption key often includes a characteristic feature in data included in the memory area data. For example, such a feature of key data represents an attribute of the key data themselves (for example, randomness of the data themselves) or an arrangement pattern (an arrangement position and a sequence of arranged data) of such key data in the memory area data.

The feature of key data varies depending on various types of conditions related to execution of cryptographic communication. For example, such conditions include an encryption scheme (encryption algorithm) used in the aforementioned cryptographic communication protocol, an encryption parameter (to be described later) used in the encryption scheme, and an execution environment (to be described later) of processing related to the encryption scheme in the analysis target apparatus 101. A specific example includes a case that, when a key length of an encryption key used in a specific encryption algorithm varies, the feature of key data may vary. Further, for example, since information required for encryption processing including the encryption key varies by a cipher mode of operation used in each encryption algorithm, the feature of key data may vary accordingly. The cipher mode of operation is a processing method in encryption of a plaintext longer than a block length when a block cipher is employed as an encryption algorithm.

The key candidate extraction unit 104a extracts data matching a specific feature of key data from the memory area data as a key data candidate. Thus, the key candidate extraction unit 104a is able to extract the aforementioned encryption key candidate.

For example, information (data) indicating the feature of key data can be collected in advance for each combination of the various types of conditions, in accordance with prior knowledge about an encryption algorithm, a preliminary experiment, or the like. Then, pattern generation of the collected data indicating the feature of key data can provide determination information which can be used to extract the key data candidate from the memory area.

A specific method of collecting data indicating the feature of key data may be appropriately selectable. For example, a user, a developer, an administrator, or the like (hereinafter referred to as a "user or the like") of the analysis system executes an experimental cryptographic communication program capable of outputting an encryption key on the analysis target apparatus 101.

Then, for example, the user or the like, by use of the data acquisition unit 102, acquires memory area data in the analysis target apparatus 101 at a specific timing when the experimental communication program is executed. The user or the like searches the acquired memory area data for a (true) encryption key output from the experimental program. A feature common to an area in which an encryption key is placed can be extracted by repeating such an experiment. Further, for example, the user or the like is able to extract a feature characteristic of the key data in accordance with general knowledge about an encryption scheme (for example, a key length of an encryption key and randomness of an encryption key).

Further, for example, the user or the like may hook an API used for cryptographic communication in the analysis target apparatus 101 when executing the experimental program on the analysis target apparatus 101. The user or the like analyzes an argument passed to the hooked API, thereby, obtains an encryption key, and analyzes a feature of key data indicating the encryption key. Further, the user or the like investigates where data indicating the encryption key are placed are placed in the memory unit 101b in the analysis target apparatus. The user or the like collects thus obtained investigation result as data indicating the feature of key data. The method of hooking an API is a known technology, and therefore detailed description of the method will be omitted.

The method of collecting data indicating the feature of key data is not limited to the aforementioned specific example, and any method may be employable.

As described above, collecting and extracting pattern from data indicating a feature of key data in advance depending on the aforementioned various types of conditions enables to provide determination information for extracting the aforementioned key data candidate from memory area data. For example, such determination information may include a location (place) where a key data candidate is searched for (extracted) in memory area data, and a determination criterion for determining whether or not specific data are key data.

The key candidate extraction unit 104a according to the present example embodiment extracts a key data candidate including the encryption key from memory area data in accordance with such determination information. More specifically, the key candidate extraction unit 104a extracts a key data candidate based on the key candidate determination information 104b including determination information by which a key data candidate including the encryption key can be extracted.

As exemplified in FIG. 7, the key candidate determination information 104b includes information indicating a type of an encryption scheme (encryption algorithm) (701 in FIG. 7) and a key candidate determination criterion (704 in FIG. 7). The key candidate determination criterion 704 is associated with the encryption algorithm 701. Such key candidate determination criterion 704 is information which can indicate a criterion for determining whether specific data included in memory area data are key data including the encryption key. In other words, the key candidate determination criterion 704 is a criterion for determining whether specific data included in memory area data is key data including the encryption key in accordance with data indicating a feature of key data.

Further, the key candidate determination information 104b may additionally include an encryption parameters (702 in FIG. 7) related to the encryption algorithm, and information indicating an execution environment (703 in FIG. 7) of encryption processing related to the encryption algorithm 701 in the analysis target apparatus 101, respectively associated with the encryption algorithm 701.

For example, the encryption algorithm 701 may include an identifier (ID) for identifying a specific encryption algorithm.

For example, information being expressed by use of any machine interpretable form (format) may be registered in the key candidate determination criterion 704.

As exemplified in FIG. 7, the encryption parameter 702 may include information about a length of a key (key length) used in the encryption algorithm 701, and a cipher mode of operation. As described above, the cipher mode of operation is a processing method in encryption of a plaintext longer than a block length when a block cipher is employed as the encryption algorithm 701. For example, Cipher Block Chaining (CBC) mode and Galois/Counter Mode (GCM) are known as such an encryption mode.

For example, the execution environment information 703 includes information about a library implemented with processing related to the encryption algorithm 701 in the analysis target apparatus 101, and information about an execution environment of the analysis target apparatus 101. More specifically, for example, the execution environment information 703 may be information by which an OS (for example, Windows [registered trademark] and Linux [registered trademark]) and an encryption processing implementation (for example, Cryptography Next Generation [CGN] API and OpenSSL) in the analysis target apparatus 101 can be specified.

The key candidate determination information 104b may be preset to the key candidate extraction unit 104a by any technique.

The key candidate extraction unit 104a determines whether or not to extract a specific data area in memory area data as a key candidate in accordance with the key candidate determination information 104b (the key candidate determination criterion 704 in particular).

Extraction processing of the aforementioned key data candidate in the key candidate extraction unit 104a will be described below with reference to a specific example illustrated in FIG. 7.

For example, as exemplified in FIG. 7, it is assumed that an encryption algorithm 701 is "AES," a key length in an encryption parameter 702 is "128 bits" or "256 bits," and a cipher mode of operation in the encryption parameter 702 is "CBC." AES is an abbreviation of "Advanced Encryption Standard".

In this case, the key candidate extraction unit 104a refers to a key candidate determination criterion 704 associated with the encryption algorithm 701 and the encryption parameter 702. Then, the key candidate extraction unit 104a extracts 16 or 32 consecutive bytes of data area with an information entropy value greater than or equal to a specific reference value, from memory area data stored in the memory dump storage unit 102a. Hereinafter, for convenience of description, information entropy is simply denoted by entropy.

In general, as entropy of values indicated by data included in a data area (may be hereinafter referred to as "entropy of data") becomes larger, a dispersion of the values indicated by the data included in the data area becomes larger. Further, an encryption key is often a random number value (in which a regularity cannot be found), and therefore values of key data including an encryption key is assumed to have a large dispersion. Accordingly, the key candidate extraction unit 104a is able to extract a data area including data having a large dispersion value as a key data candidate in accordance with the determination criterion as exemplified in FIG. 7.

The magnitude of such a dispersion can be calculated by use of various known calculation methods. As a specific example, the key candidate extraction unit 104a may calculate a standard deviation (or variance) of a key data candidate as a magnitude of dispersion. A calculation method of a standard deviation (or variance) is a known technology, and therefore detailed description will be omitted.

For example, as exemplified in FIG. 7, it is assumed that an encryption algorithm 701 is "AES," a key length in an encryption parameter 702 is "128 bits," and a cipher mode of operation in the encryption parameter 702 is "GCM." In this case, the key candidate extraction unit 104a refers to a key candidate determination criterion 704 associated with the encryption algorithm 701 and the encryption parameter 702, and extracts data determined to satisfy "560 consecutive bytes of data starting from 0x30, 0x02, 0x00, 0x00, 0x4b, 0x53, 0x53, 0x4D" from memory area data. For example, key data including an encryption key may include a specific arrangement pattern in a specific execution environment in the analysis target apparatus 101. As exemplified in FIG. 7, when a key candidate determination criterion 704 includes such an arrangement pattern as, the key candidate extraction unit 104a is able to extract data matching such an arrangement pattern as a key data candidate.

In other words, "0x30, 0x02, 0x00, 0x00, 0x4b, 0x53, 0x53, 0x4D" is a tag as a clue for specifying a memory area storing a key candidate. In this case, for example, the key candidate extraction unit 104a, based on tag information representing the tag, extracts 560 bytes data after the tag specified by the tag information as a key data candidate.

For example, the key candidate extraction unit 104a may extract a specific size of data by successive shifting by a specific size (for example, 1 byte) from a specific location (for example, the top) of memory area data, and determine whether or not the data is a key candidate in accordance with the key candidate determination criterion 704.

It is assumed that information about a cipher suite can be acquired from a result of analyzing communication data related to certain cryptographic communication by the cryptographic communication check unit 103b. In this case, information about the encryption algorithm 701 and the encryption parameter 702 respectively related to the cryptographic communication can be handled as known information confirmed by the communication data. The execution environment information 703 about the analysis target apparatus 101 can be handled as known information by a method such as presetting to the cryptanalysis unit 104.

When the encryption algorithm 701 and the encryption parameter 702 are unknown, the key candidate extraction unit 104a may extract a key data candidate conforming to each criterion by use of all key candidate determination criterion 704 registered in the key candidate determination information 104b. In this case, it is possible to specify key data including the encryption key used for encryption of the communication data, an encryption algorithm, and an encryption parameter in accordance with a result of decrypting of encrypted communication data using the extracted key data candidate by the decryption unit 104d, to be described later.

Further, the key candidate extraction unit 104a may extract a key data candidate, acquire another piece of required information used for encryption or decode processing of communication data (may be hereinafter referred to as "encryption processing data") in a specific cryptographic communication protocol.

For example, such encryption processing data may include the following data. Specifically, such encryption processing data may include an initialization vector (IV) in a case that a block cipher is used as an encryption algorithm. Such encryption processing data may also include various types of parameters (for example, a counter in a counter mode and a number used once (nonce) being a value for one time use) used in a specific cipher mode of operation. Such encryption processing data may also include authentication information assigned to encrypted communication data. Such encryption processing data are not limited to the above and may include any data required depending on an encryption algorithm, an encryption parameter 802, and the like.

For example, the key candidate extraction unit 104a may acquire communication data from the cryptographic communication check unit 103b or the communication control unit 103a, analyze the acquired communication data, and acquire such encryption processing data. Further, for example, the key candidate extraction unit 104a may acquire encryption processing data out of memory area data stored in the memory dump storage unit 102a in accordance with a specific determination criterion similarly to the aforementioned key data candidate.

The key candidate extraction unit 104a stores (registers) a key data candidate extracted from memory area data into the key candidate storage unit 104c. Further, the key candidate extraction unit 104a may store (register) encryption processing data related to the key data candidate into the key candidate storage unit 104c.

As exemplified in FIG. 8, the key candidate storage unit 104c generate information where each encryption algorithm 801 and an extracted key data candidate 803 are associated with each other and stores the generated information. The key candidate storage unit 104c may generate information where each encryption algorithm 801 and an encryption parameter 802 used in the encryption algorithm are associated with each other and store the generated information. The key candidate storage unit 104c may also store the key data candidate 803 including the aforementioned encryption processing data as part thereof. Without being limited to the above, the key candidate storage unit 104c may store the encryption processing data in a not depicted area different from the key data candidate 803.

As exemplified in FIG. 8, the key candidate storage unit 104c may store a plurality of key data candidates related to a specific encryption algorithm (for example, "AES"). The configuration exemplified in FIG. 8 is a specific example, and the key candidate storage unit 104c according to the present example embodiment is not limited to the configuration.

Next, the decryption unit 104d according to the present example embodiment will be described.

As exemplified in FIG. 1, the decryption unit 104d includes an analysis result determination information 104e and an analysis result storage unit 104f.

When a key data candidate is extracted in the key candidate extraction unit 104a, the decryption unit 104d decrypts (decodes) (encrypted) communication data stored in the communication data storage unit 103f, by use of the key data candidate.

The decryption unit 104d refers to (encrypted) communication data stored in the communication data storage unit 103f and decrypts (decodes) the encrypted communication data by use of a key data candidate stored in the key candidate storage unit 104c. Specifically, the decryption unit 104d decrypts (decodes) communication data communicated in cryptographic communication between the analysis target apparatus 101 and the communication network 105, by use of a key data candidate stored in the key candidate storage unit 104c. The decryption unit 104d may decrypt (decode) communication data by use of a key data candidate and encryption processing data acquired by the key candidate extraction unit 104a, as needed. Communication data being decrypted (decoded) may be hereinafter referred to as "decrypted communication data."

The decryption unit 104d determines whether or not the decrypted communication data are correctly decrypted (decoded) in accordance with data indicating a feature of decrypted communication data. For example, such data indicating a feature of decrypted communication data indicate, an attribute of the decrypted communication data themselves (for example, randomness of the data themselves) or a data format of the decrypted communication data.

Specifically, the decryption unit 104d determines whether or not a result of decryption of communication data with a specific key data candidate is successful in accordance with the analysis result determination information 104e. Then, when the decryption of the communication data is successful, the decryption unit 104d stores (registers) key data used for the decryption into the analysis result storage unit 104f. Further, the decryption unit 104d may store (register) encryption processing data used for the decryption into the analysis result storage unit 104f along with the key data.

In the following, key data, by which communication data are successfully decrypted in accordance with the analysis result determination information 104e, may be hereinafter referred to as "correct key data."

Figure 9:
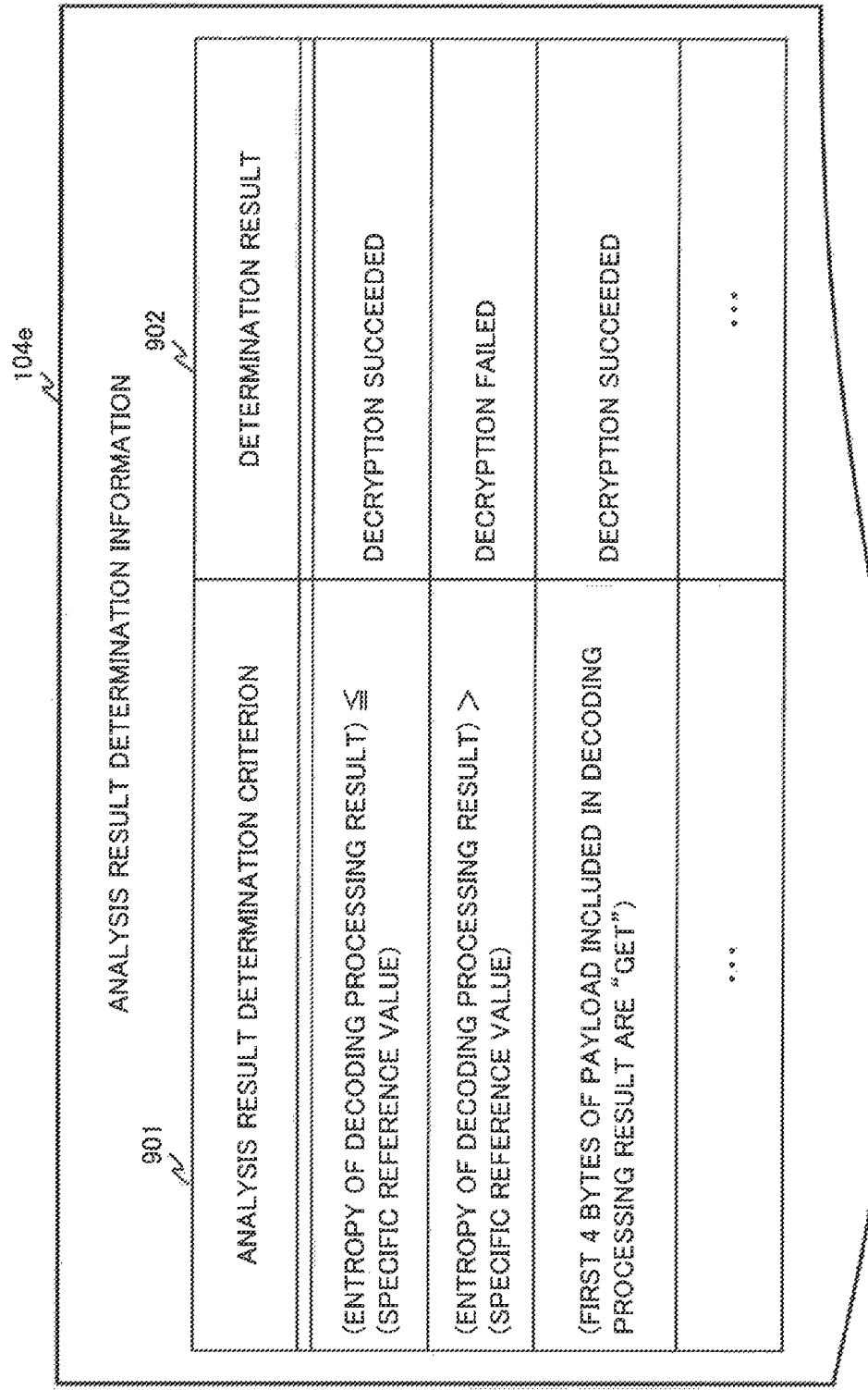
FIG. 9 is a diagram illustrating an example of analysis result determination information according to the first example embodiment.

As illustrated in FIG. 9, the analysis result determination information 104e includes an analysis result determination criterion 901 and a determination result 902.

In the analysis result determination criterion 901, information indicating a criterion by which whether the decrypted communication data are correctly decrypted (decoded) in accordance with data indicating a feature of decrypted communication data, is set. In this case, for example, information set to the analysis result determination criterion 901 may be described in any machine interpretable form (format).

When the decryption unit 104d decrypts specific communication data and a decryption result satisfies the analysis result determination criterion 901, the determination result (whether or not the description is successful) is registered in the determination result 902. In this case, a symbol or the like indicating the determination result may be registered in the determination result 902.

The decryption unit 104d determines whether or not communication data are successfully decoded in accordance with the analysis result determination criterion 901.

Determination process of whether or not communication data are successfully decrypted by the decryption unit 104d will be described with reference to a specific example illustrated in FIG. 9.

For convenience of description, it is assumed that decrypted communication data are, for example, numeric values described in accordance with a code such as American Standard Code for Information Interchange (ASC II)

In the specific example illustrated in FIG. 9, for example, when entropy of the decrypted communication data is less than or equal to a specific reference value, the decryption unit 104d determines that decrypted communication data are correctly decoded.

Further, for example, contrary to the above, when entropy of the decrypted communication data is greater than a specific reference value, the decryption unit 104d determines that decryption of communication data is unsuccessful.

In general, as described above, as entropy of data becomes larger, a dispersion of values indicated by data in the data area becomes larger. That is to say, when entropy of decrypted communication data is less than or equal to a specific reference value, a dispersion of values indicated by data included in the decrypted communication data is relatively small, and therefore it is highly likely that decryption is successful. On the other hand, when entropy of decrypted communication data is greater than a specific reference value, a dispersion of values indicated by data included in the decrypted communication data is large (for example, randomness is high), and therefore it is highly likely that decryption is unsuccessful. The reason is that, in general, encrypted data (communication data) often take random number values (in which a regularity cannot be found) and values indicated by such data have a large dispersion.

The specific reference value for determining a magnitude of dispersion (entropy) of data may be appropriately selected in accordance with knowledge about a general characteristic (randomness) of communication data themselves, a preliminary experiment, or the like.

For example, a standard deviation a may be used as a criterion indicating a dispersion degree of such data. When a dispersion of data follows a normal distribution and a mean value of the data is denoted by "m", approximately 68.2% of the entire data are included in a range of "m±σ" and approximately 95.4% in a range of "m±2σ". In other words, when the value of σ is large, decrypted communication data have an extremely large dispersion (have high randomness). In this case, the decryption unit 104d may appropriately select a value of such σ so as to determine decryption to be successful when a dispersion of the decrypted communication data is relatively small.

Further, for example, as exemplified in FIG. 9, whether or not decrypted communication data include specific data may be employed as a criterion of determining whether or not decryption of the decrypted communication data is successful. The reason is that, when decrypted communication data include known data or a specific pattern, it is highly likely that the decrypted communication data are correctly decrypted.

Further, for example, a criterion indicating whether decrypted communication data conform to a specific data format (description form representing various types of data) may be employed as a criterion of determining whether or not decryption of the decrypted communication data is successful. For example, the data format may include a data format describing various types of voices, images, videos, and documents. Further, for example, the data format may include a file format in a specific file system. The specific example illustrated in FIG. 9 is a typical example, and the present example embodiment is not limited thereto.

The analysis result determination information 104e may be preset to the decryption unit 104d by any technique.

For example, the decryption unit 104d decrypts communication data by use of each key data candidates stored in the key candidate storage unit 104c and determines a decryption result in accordance with the analysis result determination information 104e. Thus, the decryption unit 104d is able to extract correct key data. The decryption unit 104d may apply the above-describe decryption processing to all communication data stored in the communication data storage unit 103f.

The decryption unit 104d stores (registers) correct key data and decrypted communication data decrypted with the correct key data into the analysis result storage unit 104f, based on the result of decrypting communication data in accordance with the analysis result determination information 104e. The decryption unit 104d may notify completion of the decryption processing of the communication data to the cryptographic communication check unit 103b as described above.

Figure 10:
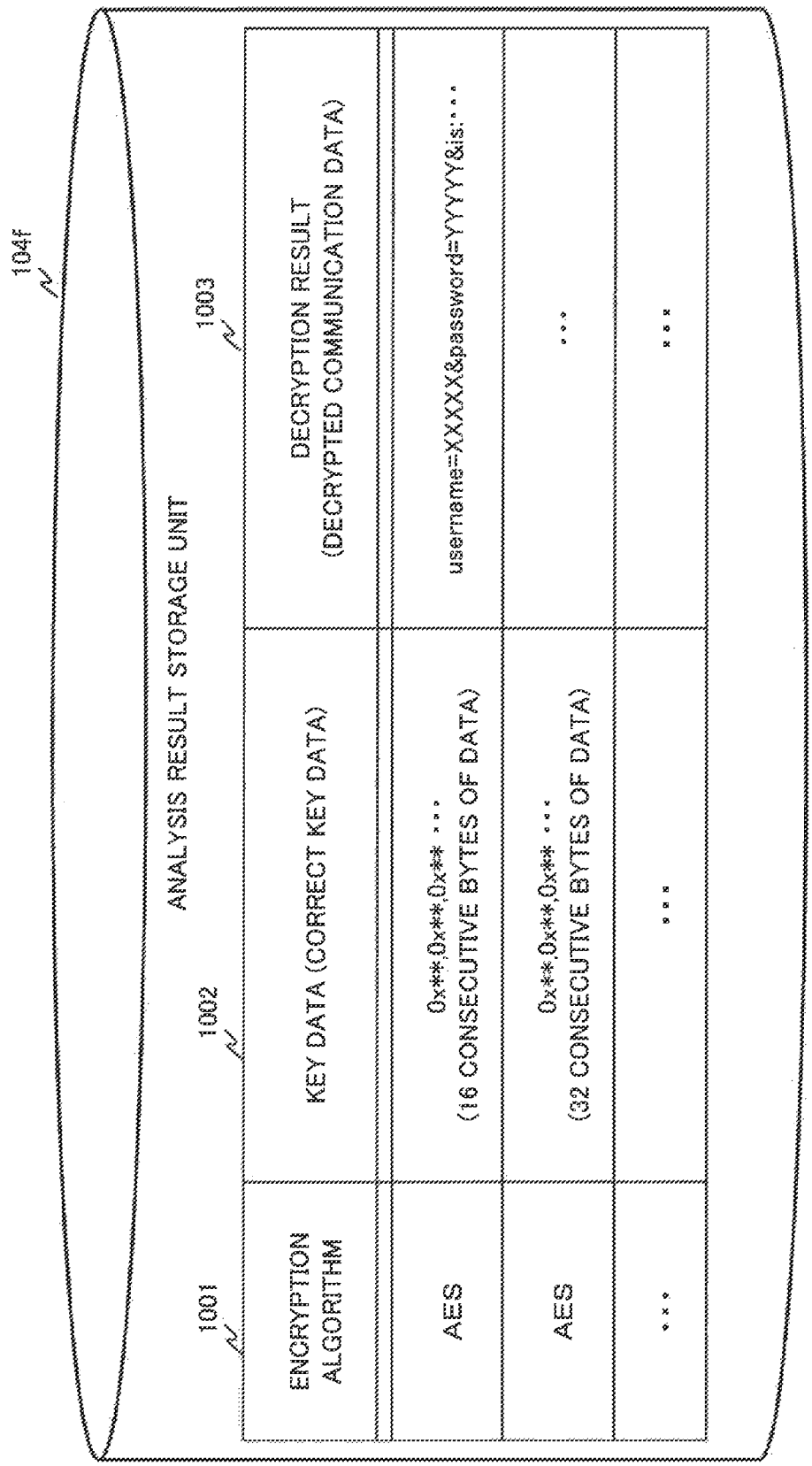
FIG. 10 is a diagram illustrating an example of an analysis result storage unit according to the first example embodiment.

As exemplified in FIG. 10, the analysis result storage unit 104f stores information by which an encryption algorithm can be specified (encryption algorithm 1001 in FIG. 10), correct key data (key data 1002 in FIG. 10), and decrypted communication data (decryption result 1003 in FIG. 10) in association with each other. The configuration exemplified in FIG. 10 is a specific example, and the analysis result storage unit 104f according to the present example embodiment is not limited thereto. For example, the analysis result storage unit 104f may store only the correct key data or only the decrypted communication data, or may store the data separately. Further, the analysis result storage unit 104f may store encryption processing data used in decryption of communication data along with the aforementioned correct key data as part of the key data 1002. The analysis result storage unit 104f may store the encryption processing data in a not depicted area separate from the key data 1002.

(Operation of Analysis System 100)

Next an operation of the analysis system 100 will be described. In the following description, it is assumed as a specific example that a cryptographic communication protocol between the analysis target apparatus 101 and the communication network 105 is SSL.

Figure 11:
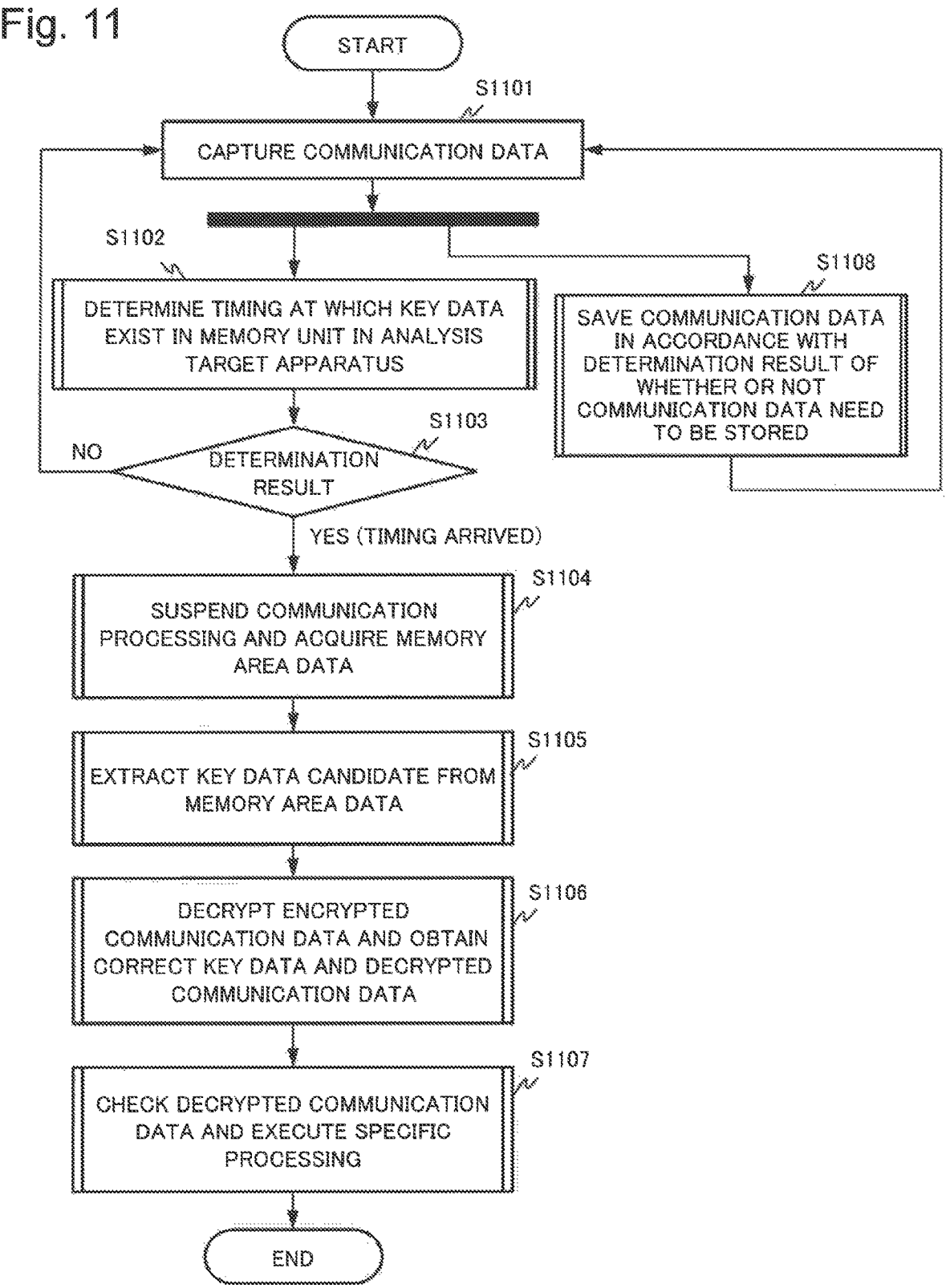
FIG. 11 is a flowchart exemplifying an overview of operation of the analysis system according to the first example embodiment.

An overview of the operation of the analysis system 100 will be described with reference to FIG. 11.

First, the communication processing unit 103 captures communication data communicated between the analysis target apparatus 101 and the communication network 105 (Step S1101).

Next, the communication processing unit 103 analyzes the captured communication data and determines a timing at which the memory unit 101b in the analysis target apparatus 101 is storing key data (Step S1102).

When the timing is determined to have arrived in Step S1102 (YES in Step S1103), the data acquisition unit 102 acquires memory area data stored in memory unit 101b in the analysis target apparatus 101 (Step S1104). When the determination result in Step S 1103 is NO, the communication processing unit 103 returns to processing of Step S1101 and continues the processing.

Next, the cryptanalysis unit 104 analyzes the memory area data acquired in Step S 1104, in accordance with a specific criterion and extracts a key data candidate (Step S1105).

Next, the cryptanalysis unit 104 acquires correct key data and decrypted communication data based on the decryption result of the communication data with the key data candidate extracted in Step S1105 (Step S1106).

Next, the communication processing unit 103 (the cryptographic communication check unit 103b in particular) analyzes a content of the decrypted communication data obtained in Step S1106 and executes specific processing (Step S1107). As described above, the communication processing unit 103 (the cryptographic communication check unit 103b in particular) may appropriately select such specific processing.

After capturing communication data in Step S1101, the communication processing unit 103 determines whether or not the communication data need to be stored, and stores the communication data based on the determination result (Step S1108). The processing in Step S1108 may be executed in parallel (or in pseudo-parallel) with the processing in Steps S1102 to S1105.

Next, details of the operation of the analysis system 100 will be described.

First, operations of the data acquisition unit 102 and the communication processing unit 103 will be described with reference to flowcharts exemplified in FIGS. 12A and 12B. The flowchart exemplified in FIG. 12A will be described below. FIG. 12B is a flowchart similar to FIG. 12A except for Steps S1209B and S1210B to be described later, and therefore only difference points between them will be described. Processing exemplified in Steps S1201 to S1208 below are similar to Steps S1101 to S1105 exemplified in FIG. 11.

First, the communication control unit 103a captures communication data communicated between the analysis target apparatus 101 and the communication network 105 (Step S1201).

In this case, as described above, the communication control unit 103a is able to capture both of communication data transmitted from the analysis target apparatus 101 to the communication network 105 and communication data transmitted from the communication network 105 to the analysis target apparatus 101.

Next, the cryptographic communication check unit 103b analyzes the communication data captured in Step S1201, and determines whether or not to acquire memory area data stored in the memory unit 101b, in accordance with the key data acquisition policy 103c (Step S1202).

More specifically, the cryptographic communication check unit 103b determines a timing at which the memory unit 101b in the analysis target apparatus 101 is storing key data in accordance with the key data acquisition policy 103c.

Figure 13:
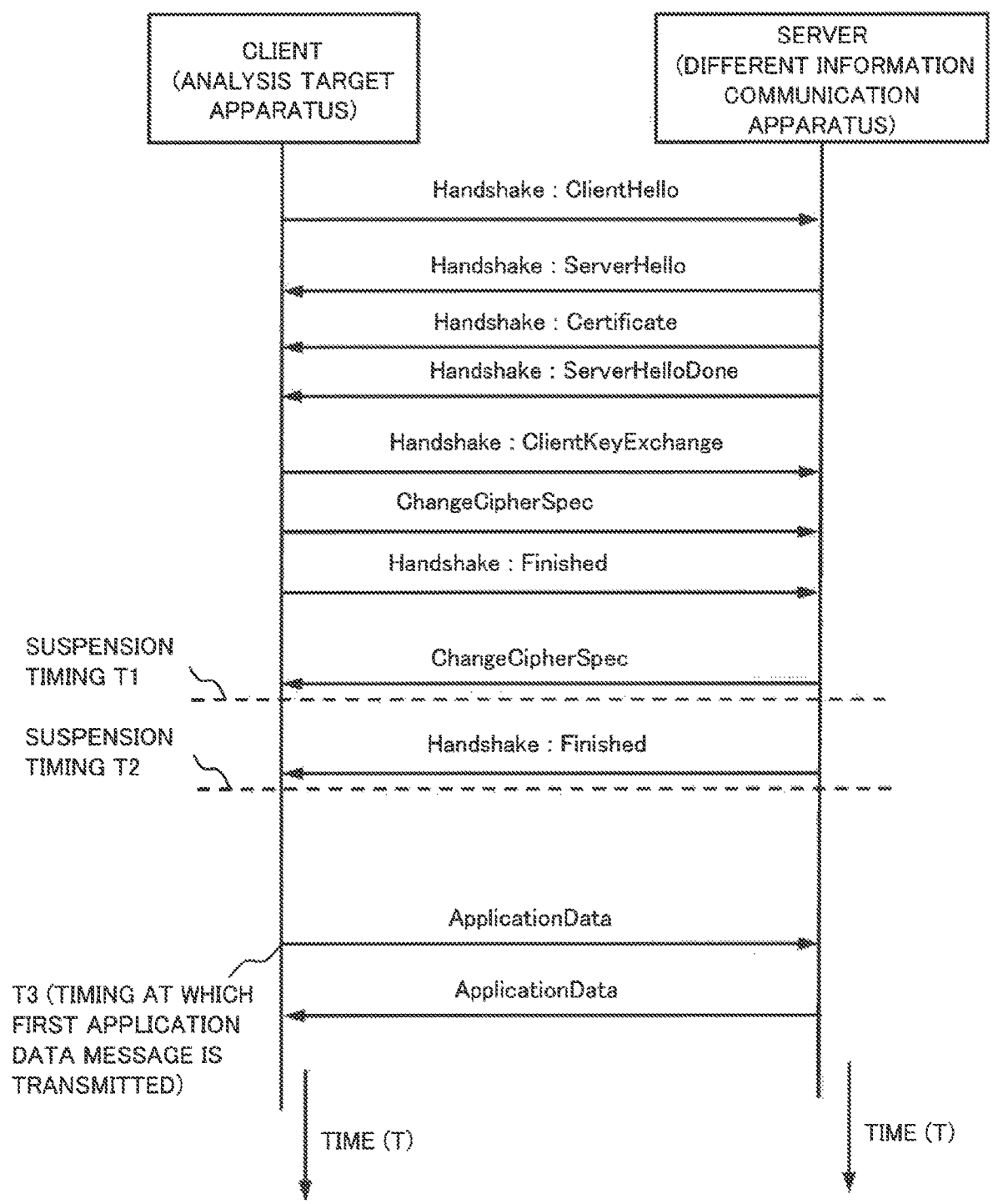
FIG. 13 is a sequence diagram exemplifying a process for sharing an encryption key in accordance with SSL protocol.

When SSL is employed as a cryptographic communication protocol, the cryptographic communication check unit 103b may, for example, determine that the above-described timing arrives when the analysis target apparatus 101 receives a ChangeCipherSpec message (a "suspension timing T1" exemplified in FIG. 13) from an SSL server side (from another information communication apparatus 107 side) in a processing sequence based on the SSL protocol illustrated in FIG. 13.

Alternatively, the cryptographic communication check unit 103b may determine that the above-described timing arrives when the analysis target apparatus 101 receives a Finished message (a "suspension timing T2" exemplified in FIG. 13) from the SSL server side (another information communication apparatus 107 side).

In Step S1202, when the cryptographic communication check unit 103b determines arrival of the above-described timing (YES in Step S1203), the cryptographic communication check unit 103b instructs the communication control unit 103a to suspend communication between the analysis target apparatus 101 and the communication network 105 (Step S1204).

In this case, the communication control unit 103a receives the command and suspends the communication between the analysis target apparatus 101 and the communication network 105. A specific method for suspending communication may be appropriately selected.

In a case of NO in Step S1203, the communication control unit 103a returns to processing in Step S1201 and continues the processing.

Next, the cryptographic communication check unit 103b instructs the data acquisition unit 102 to acquire memory area data stored in the memory unit 101b in the analysis target apparatus 101 (Step S 1205).

The data acquisition unit 102 receives the command and dumps the memory area data stored in the memory unit 101b in the analysis target apparatus 101 (Step S1206). As described above, a specific dump method of data stored in the memory unit 101b may be appropriately selected depending on a configuration of the analysis target apparatus 101.

Next, the data acquisition unit 102 stores (registers) the acquired memory area data into the memory dump storage unit 102a (Step S1207).

Next, the data acquisition unit 102 notifies the cryptographic communication check unit 103b of completion of acquiring the memory area data (Step S1208).

Next, the cryptographic communication check unit 103b receives the notification in Step S1208 and instructs the communication control unit 103a to resume the suspended communication. Then, the communication control unit 103a resumes the communication (Step S1209).

When Step S1208 is not executed, the cryptographic communication check unit 103b may instruct the communication control unit 103a to resume the suspended communication when a specific time elapses after instructing suspension of the communication in Step S1204.

After the processing in Step S1209, the cryptographic communication check unit 103b may instruct the cryptanalysis unit 104 to decrypt communication data stored by the communication data recording unit 103d and to extract an encryption key (Step S1210). When an encryption algorithm and the like used in the cryptographic communication protocol is specified based on the analysis result of the communication data, the cryptographic communication check unit 103b may provide the cryptanalysis unit 104 with information about the encryption algorithm.

Figure 12A:
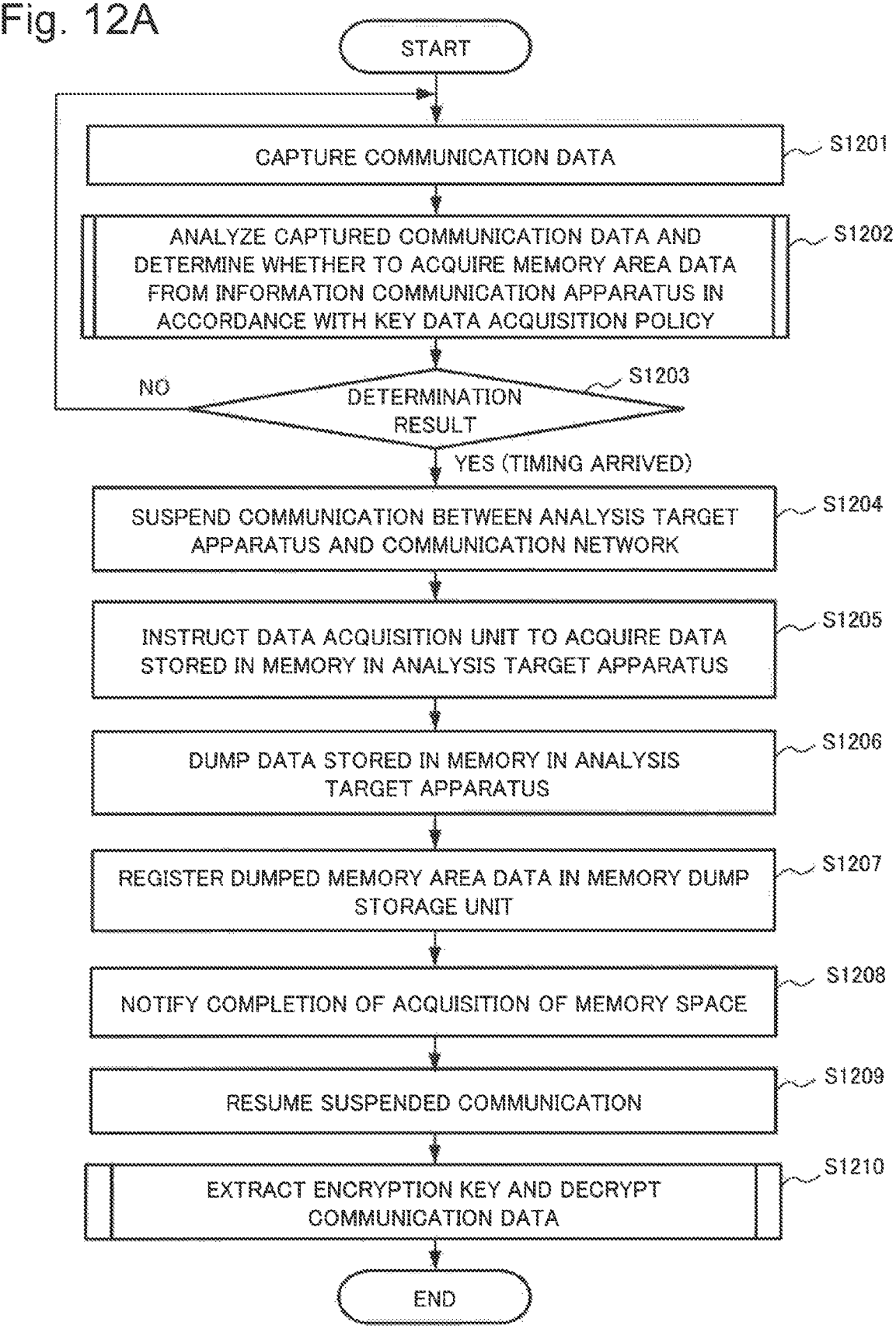
FIG. 12A is a flowchart exemplifying operation for acquiring an encryption key used in a cryptographic communication between an analysis target apparatus and a communication network in the first example embodiment.
Figure 12B:
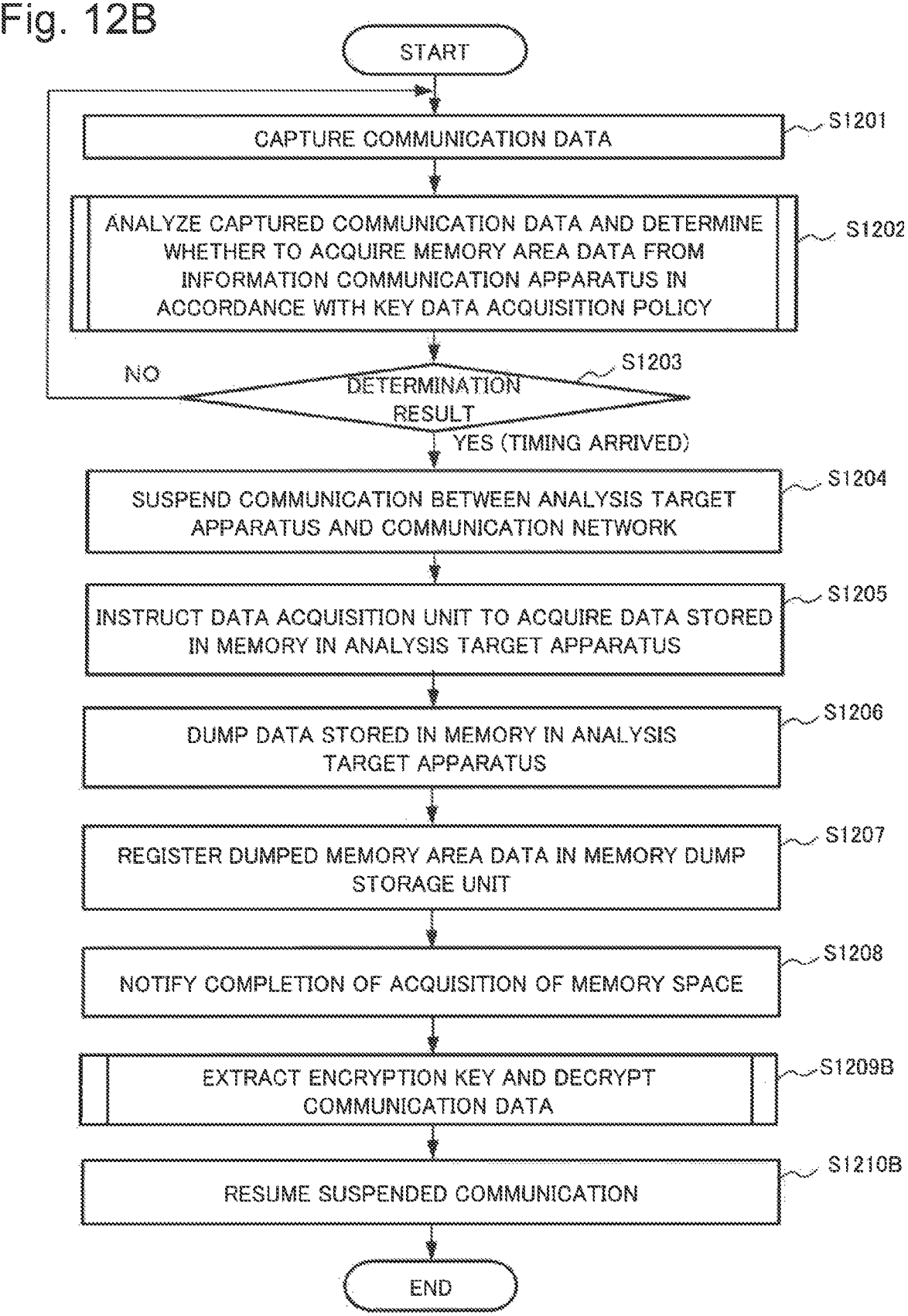
FIG. 12B is a flowchart exemplifying operation for acquiring an encryption key used in a cryptographic communication between an analysis target apparatus and a communication network in the first example embodiment.

A processing order of Steps S1209 and S1210 in FIG. 12A described above may be reversed. That is to say, as exemplified in FIG. 12B, the cryptographic communication check unit 103b may receive the notification in Step S1208 and instruct the cryptanalysis unit 104 to decrypt communication data stored by the communication data recording unit 103d and to extract an encryption key (Step S1209B). Then, when receiving a completion notification of the decryption processing of the communication data from the cryptanalysis unit 104, the cryptographic communication check unit 103b may instruct the communication control unit 103a to resume the suspended communication (Step S1210B).

Next, processing of the communication processing unit 103 (the communication data recording unit 103d in particular) will be described with reference to a flowchart exemplified in FIG. 14. The following Steps S1401 to S1404 correspond to Step S1108 exemplified in aforementioned FIG. 11.

Figure 14:
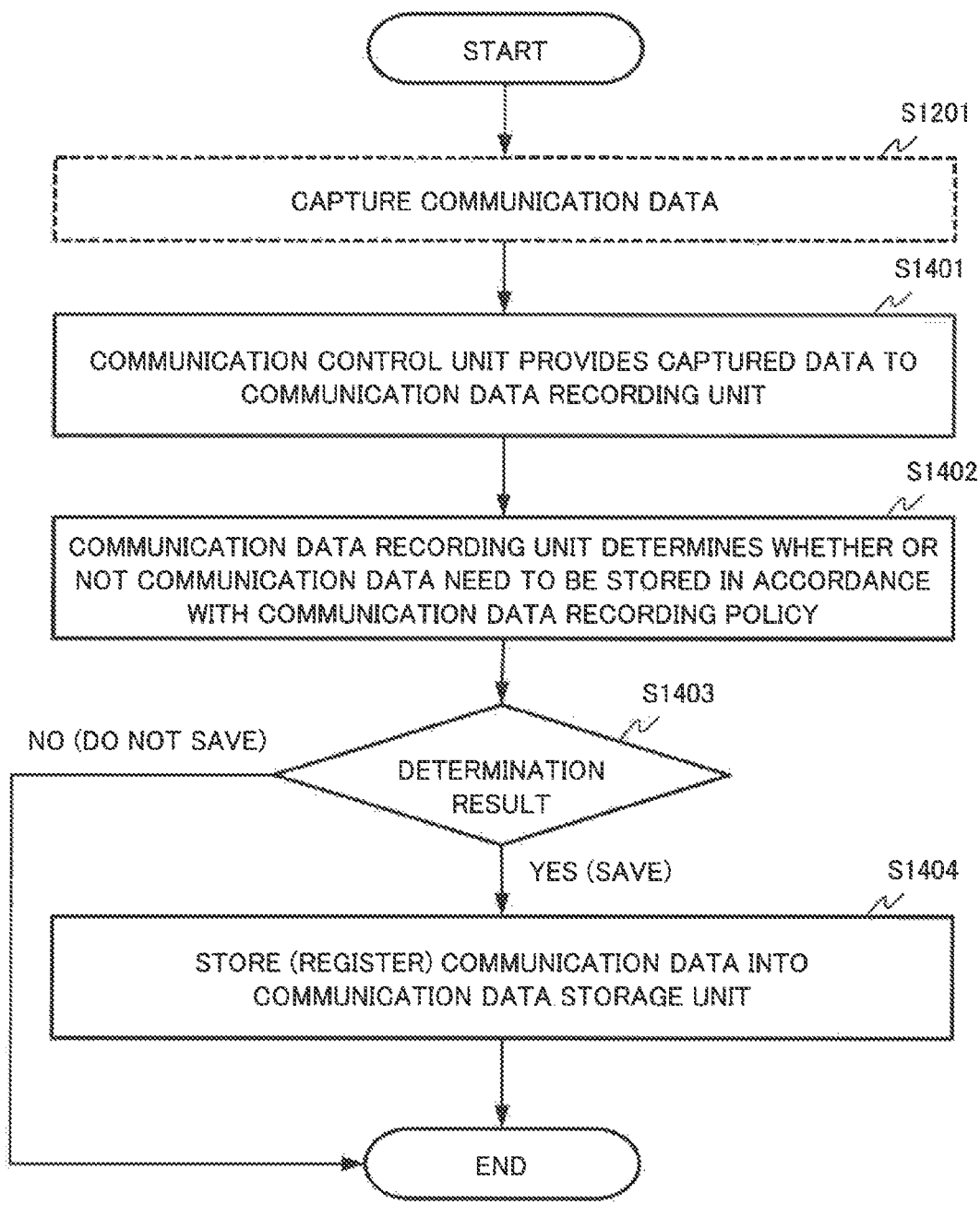
FIG. 14 is a flowchart exemplifying operation of a communication processing unit (for example, a communication data recording unit) according to the first example embodiment.

First, in Step S1201 indicated in FIG. 14, the communication control unit 103a captures communication data. The processing may be similar to Step S1201 exemplified in FIGS. 12A and 12B.

Next, the communication control unit 103a provides (notifies) the captured communication data to the communication data recording unit 103d (Step S1401).

The communication data recording unit 103d determines whether or not to store the communication data captured in Step S1201 in accordance with the communication data recording policy 103e (Step S1402).

When SSL is employed as a communication protocol, for example, the communication data recording policy 103e (the communication data recording criterion 502 in particular) may include a condition representing that communication data at or after "T3" is stored (recorded). "T3" is a timing of transmitting the first ApplicationData message exemplified in FIG. 13.

Alternatively, for example, the communication data recording policy 103e (the communication data recording criterion 502 in particular) may include a condition indicating that communication data at or after the "suspension timing T1" or the "suspension timing T2" respectively, as exemplified in FIG. 13 is stored (recorded).

When the communication data are stored in accordance with a determination result in Step S1402 (YES in Step S1403), the communication data recording unit 103d registers (stores) the communication data into the communication data storage unit 103f (Step S1404).

In a case of NO in Step S1403, the communication data recording unit 103d does not need to store the communication data.

Through the processing in Steps S1401 to S1404, communication data are stored in the communication data storage unit 103f as needed.

Figure 15:
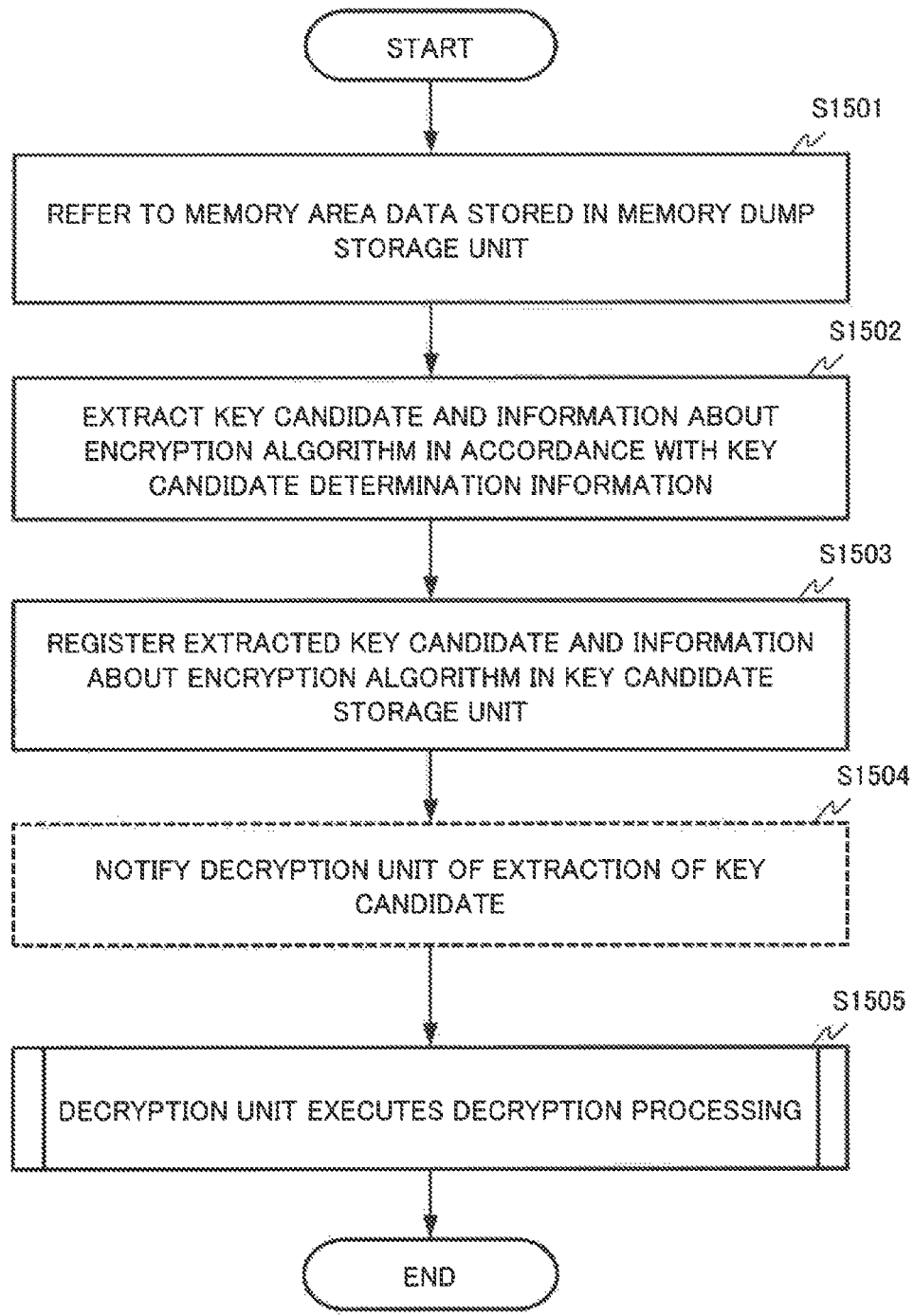
FIG. 15 is a flowchart exemplifying operation of a crypt-analysis unit (for example, a key candidate extraction unit) according to the first example embodiment.
Figure 16:
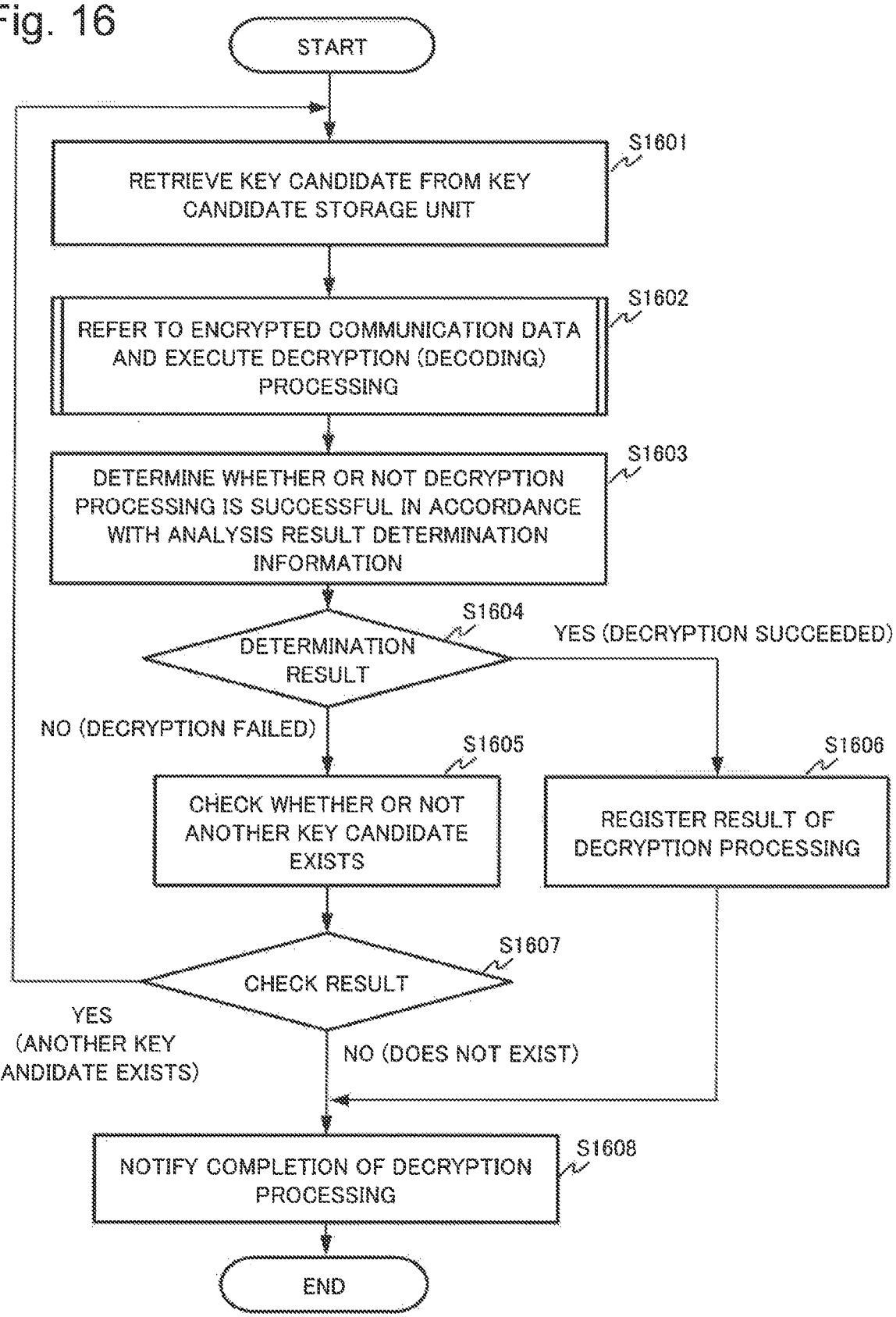
FIG. 16 is a flowchart exemplifying operation of a crypt-analysis unit (for example, a decryption unit) according to the first example embodiment.

Next, processing of the cryptanalysis unit 104 will be described with reference to flowcharts exemplified in FIGS. 15 and 16. The flowcharts exemplified in FIGS. 15 and 16 correspond to Steps S1105 and S1106 in FIG. 11.

First an operation of the key candidate extraction unit 104a will be described with reference to the flowchart exemplified in FIG. 15.

As described above, for example, the cryptanalysis unit 104 starts decryption processing of encrypted communication data in response to an command from the cryptographic communication check unit 103b (Step S1210).

First, the key candidate extraction unit 104a refers to memory area data registered (stored) in the memory dump storage unit 102a (Step S1501). In this case, the key candidate extraction unit 104a may acquire the memory area data from the memory dump storage unit 102a.

Next, the key candidate extraction unit 104a extracts an encryption key candidate from the memory area data referred (acquired) in Step S1501, in accordance with the key candidate determination information 104b (Step S1502).

As described above, when information about an encryption algorithm is provided by the cryptographic communication check unit 103b, the key candidate extraction unit 104a extracts a key data candidate from the memory area data based on a key candidate determination criterion 704 associated with the encryption algorithm.

When the encryption algorithm is unknown, the key candidate extraction unit 104a extracts a key data candidate for every encryption algorithm 701 registered in the key candidate determination information 104b in accordance with a key candidate determination criterion 704.

Further, at this time, the key candidate extraction unit 104a may extract information about an encryption algorithm associated with a key data candidate (for example, an encryption algorithm 701 and an encryption parameter 702).

Next, the key candidate extraction unit 104a registers (stores) the key candidate and the information about the encryption algorithm respectively extracted in Step S1502 into the key candidate storage unit 104c (Step S1503).

After Step S1503, the key candidate extraction unit 104a may notify the decryption unit 104d of completion of the extraction processing of the key candidate (Step S1504).

Next, the decryption unit 104d decrypts encrypted communication data by use of the key data candidate extracted in Steps S1501 to S1503 (Step S1505).

Details of the processing in Step S1505 will be described with reference to the flowchart exemplified in FIG. 16.

First, the decryption unit 104d acquires a key data candidate registered in the key candidate storage unit 104c (803 in FIG. 8) (Step S1601). At this time, the decryption unit 104d may acquire information about an encryption algorithm associated with the key candidate (801 and 802 in FIG. 8). Further, the decryption unit 104d may acquire encryption processing data associated with the key candidate.

Next, the decryption unit 104d refers to encrypted communication data registered (stored) in the communication data storage unit 103f. In this case, the decryption unit 104d may acquire the communication data from the communication data storage unit 103f.

Then, the decryption unit 104d decrypts (decodes) the acquired communication data, by use of the key data candidate and the information about the encryption algorithm respectively referred (acquired) in Step S1601 (Step S1602).

Next, the decryption unit 104d determines whether or not the decrypted communication data being the result of decrypting (decoding) the communication data in Step S1602 are correctly decrypted (decoded), in accordance with the analysis result determination information 104e (Step S1603).

As described above, for example, the decryption unit 104d may determine whether or not the decrypted communication data are correctly decrypted, in accordance with an entropy value of the decrypted communication data, or whether or not the decrypted communication data match a specific data format.

When determining that the decrypted communication data are correctly decrypted (YES in Step S1604), the decryption unit 104d registers the correct key data and the decrypted communication data into the analysis result storage unit 104f (Step S1606).

When determining that the decrypted communication data are not correct (NO in Step S1604), the decryption unit 104d checks whether another key data candidate is registered in the key candidate storage unit 104c (Step S1605).

When another key data candidate is registered (YES in Step S1607), the decryption unit 104d restarts the processing from Step S1601 and retrieves another key data candidate from the key candidate storage unit 104c.

Through the processing from Steps S1601 to S1607, key data including an encryption key for decrypting communication data and decrypted communication data are obtained.

The decryption unit 104d may notify the cryptographic communication check unit 103b of completion of the decryption processing of the above-described communication data (Step S1608).

The cryptographic communication check unit 103b receives the notification in Step S1608 and continues the above-described processing from Step S 1107. In this case, the cryptographic communication check unit 103b is able to execute specific processing in accordance with the result of analyzing the decrypted communication data.

In the analysis system 100 according to the present example embodiment as configured above, first, the communication processing unit 103 analyzes communication data communicated between the analysis target apparatus 101 and the communication network 105, in accordance with a specific cryptographic communication protocol. Then, in accordance with the result of such analysis, the communication processing unit 103 specifies a timing of storing an encryption key in the memory unit 101b in the analysis target apparatus 101. The encryption key is for encrypting a communication channel between the analysis target apparatus 101 and the communication network 105.

The communication processing unit 103 instructs the data acquisition unit 102 to acquire memory area data stored in the memory unit 101b at the timing.

Consequently, the data acquisition unit 102 in the analysis system 100 according to the present example embodiment is able to acquire memory area data including an encryption key for encrypting a communication channel between the analysis target apparatus 101 and the communication network 105 from the memory unit 101b in the analysis target apparatus 101.

Further, the communication processing unit 103 (the cryptographic communication check unit 103b in particular) is able to instruct the communication control unit 103a to suspend communication between the analysis target apparatus 101 and the communication network 105 at the aforementioned specific timing. Consequently, the communication processing unit 103 according to the present example embodiment is able to extend a period in which the encryption key is being stored in the memory unit 101b. The reason is that, by communication between the analysis target apparatus 101 and the communication network 105 being suspended, it is expected that loss, change, or the like of the encryption key in accordance with progress of communication processing does not occur, and thereby it is also expected that the encryption key remain stored in the memory unit 101b. Accordingly, the analysis system 100 according to the present example embodiment is able to acquire memory area data highly likely including the encryption key.

Consequently, the analysis system 100 according to the present example embodiment is able to acquire data including an encryption key used in encryption processing in a cryptographic communication protocol from a memory space in the information communication apparatus, in accordance with the result of analyzing communication data communicated between the analysis target apparatus 101 and the communication network 105 in accordance with the cryptographic communication protocol.

More specifically, the analysis system 100 according to the present example embodiment is able to determine whether or not the memory unit 101b in the analysis target apparatus 101 is storing an encryption key for the cryptographic communication, by analyzing communication data communicated by the cryptographic communication, and acquire data stored in the memory unit 101b, in accordance with the determination result.

Further, in addition to the above, the analysis system 100 according to the present example embodiment provides an advantageous effect as follows.

The cryptanalysis unit 104 in the analysis system 100 according to the present example embodiment extracts an encryption key candidate (key data candidate) from the acquired memory area data, in accordance with data indicating a feature of key data including the encryption key (key candidate determination information 104b). Then, the cryptanalysis unit 104 determines whether or not the decryption (decoding) of the communication data with the extracted key data candidate is successful, in accordance with the analysis result determination information 104e. The cryptanalysis unit 104 is able to acquire key data including a correct encryption key and decrypted communication data based on such a determination result.

Consequently, the analysis system 100 according to the present example embodiment is able to efficiently extract a key data candidate from memory area data. The reason is that the cryptanalysis unit 104 can eliminate data inconsistent with the feature of key data from the key data candidate by extracting a key data candidate based on data indicating a feature of key data (key candidate determination information 104b) from the memory area data. The analysis system 100 according to the present example embodiment is able to determine correct key data included in a plurality of key data candidates. Therefore, the analysis system 100 is able to efficiently search the memory area data for the correct key data.

The cryptanalysis unit 104 in the analysis system 100 according to the present example embodiment is able to decrypt encrypted communication data with the extracted correct key data.

The communication processing unit 103 in the analysis system 100 according to the present example embodiment is able to analyze a content of communication data communicated between the analysis target apparatus 101 and the communication network 105, by use of communication data decrypted by the cryptanalysis unit 104. For example, the communication processing unit 103 is able to execute the above-described specific processing depending on the analysis result.

Consequently, the analysis system 100 according to the present example embodiment is able to analyze at least part of encrypted communication data communicated between the analysis target apparatus 101 and the communication network 105. In addition, the analysis system 100 according to the present example embodiment is able to execute specific processing depending on the result of the analysis. Specifically, for example, the analysis system 100 according to the present example embodiment is able to analyze a content of cryptographic communication by any software program such as malware executed on the analysis target apparatus 101. In particular, the analysis system 100 according to the present example embodiment is able to analyze a content of cryptographic communication by a non-invasive technology to the software program and the analysis target apparatus 101, and is able to execute any processing in accordance with the analysis result.

Modified Example Embodiment of First Example Embodiment

A modified example embodiment of the first example embodiment described above will be described below.

The key candidate extraction unit 104a according to the first example embodiment extracts a key data candidate from memory area data acquired in the data acquisition unit 102, in accordance with the key candidate determination information 104b.

A key candidate extraction unit 104a according to the present modified example embodiment has an extended functionality of extracting at least either one of the candidate of encryption processing data described above and a candidate of key-material data from memory area data in comparison with the key candidate extraction unit 104a according to the first example embodiment. The key-material data are used as base material data to generate the encryption key. For example, such a candidate of key-material data may include "pre_master_secret" and "master_secret" in SSL.

Such encryption processing data and key-material data may respectively have a characteristic feature in data included in the memory area data similarly to the above-described key data. For example, a feature of the data indicates an attribute of such data (for example, randomness of the data themselves), an arrangement pattern (an arrangement position and sequence of arranged data) of such data in the memory area data, or the like.

Further, features of encryption processing data and key-material data may vary by various types of conditions related to execution of cryptographic communication similarly to the above-described feature of key data. Specifically, for example, a feature of such data may vary by an encryption algorithm used in the above-described cryptographic communication protocol, an execution environment of processing related to the encryption scheme in the analysis target apparatus 101, or the like.

For example, not only a type of required data as encryption processing data but also a characteristic of the data themselves vary in comparison between a case of GCM as a cipher mode of operation in a specific encryption algorithm and a case of CBC mode. For example, some data have high randomness, and some data are set to predetermined values. In addition, an arrangement position of encryption processing data in memory area data may vary depending on an execution environment of encryption processing in the analysis target apparatus 101.

Collecting and extracting pattern from data indicating a feature of the data in advance can provide a determination criterion for extracting candidates of the data from memory area data similarly to the feature of key data. The key candidate extraction unit 104a according to the present modified example embodiment extracts the data candidates from the memory area data in accordance with the determination criterion. For example, the determination criterion may include locations (places) of searching (extracting) the candidates of the data. Alternatively, for example, the determination criterion may include a determination method for determining whether or not specific data corresponds to the data, and the like.

Such a determination criterion may be added to the key candidate determination information 104b according to the first example embodiment. Further, such a determination criterion may be added to the key candidate extraction unit 104a as a new component (not depicted).

When extracting a candidate of the aforementioned key-material data, the decryption unit 104d according to the present modified example embodiment may generate the key data candidate from the candidate of the key-material data. In general, a method of generating an encryption key from key-material data is defined for each cryptographic communication protocol (or an encryption algorithm used in the cryptographic communication protocol). For example, in a case of the SSL protocol, a method of generating "master_secret" from "pre_master_secret" and a method of generating a key used in cryptographic communication, and the like from "master_secret" are defined as specifications of the SSL protocol.

The decryption unit 104d according to the present modified example embodiment decrypts communication data by use of a key data candidate and a candidate of encryption processing data similarly to the first example embodiment. The decryption unit 104d according to the present modified example embodiment determines whether or not the decryption result is successful in accordance with the analysis result determination information 104e similarly to the first example embodiment.

When decryption of communication data is successful, the decryption unit 104d according to the present modified example embodiment may store (register) the correct key data, the decrypted communication data, and the encryption processing data into the analysis result storage unit 104f.

The analysis system 100 according to the present modified example embodiment is able to extract at least either one of a candidate of encryption processing data and a candidate of key-material data based on a predetermined determination criterion. Further, the analysis system 100 according to the present modified example embodiment is able to acquire correct key data and decrypted communication data in accordance with a result of decrypting the communication data by use of the data similarly to the first example embodiment.

Second Example Embodiment

Figure 17:
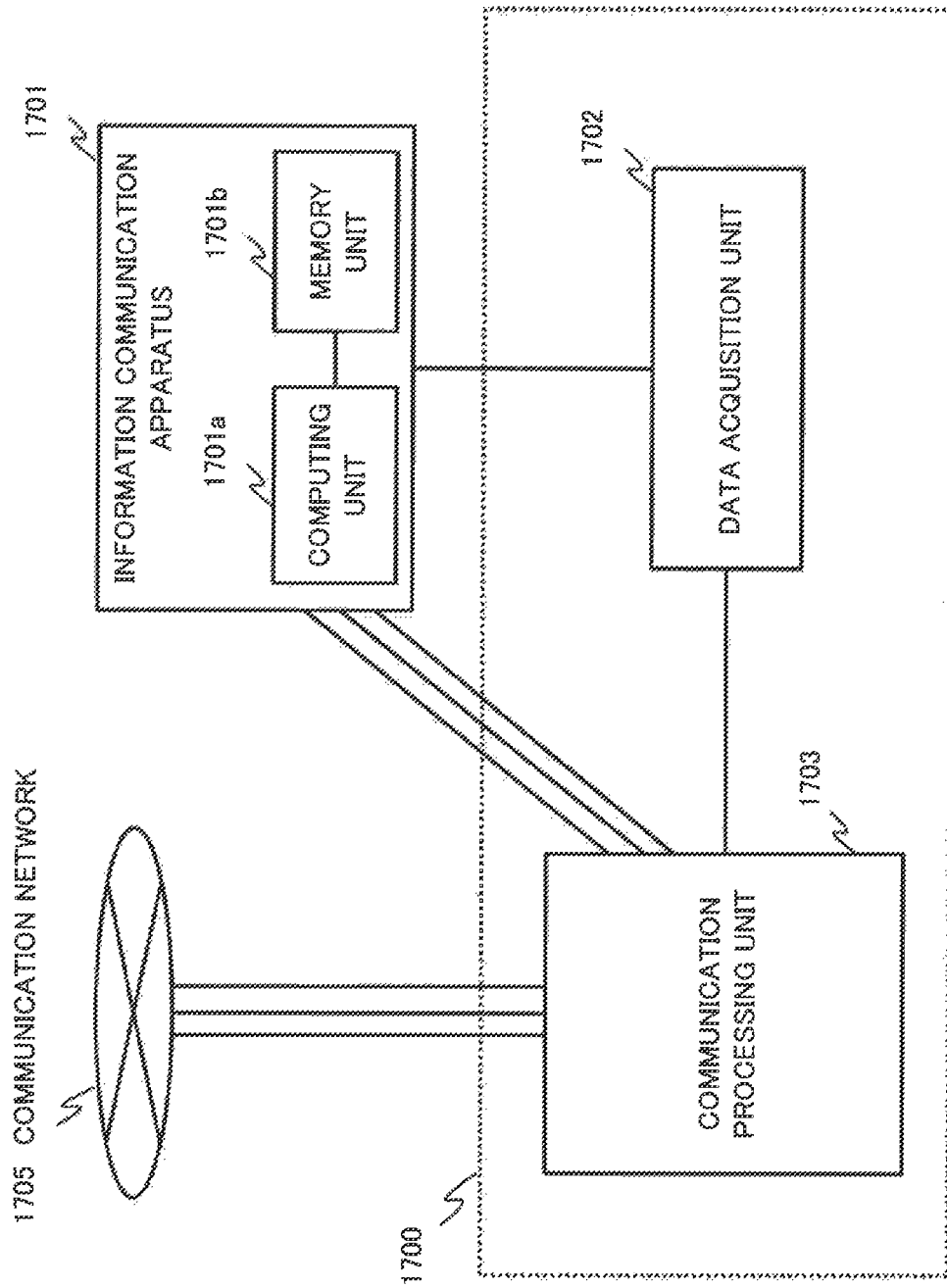
FIG. 17 is a block diagram illustrating a functional configuration of an analysis system, an analysis target, and the like according to a second example embodiment of the present invention.

Next, a second example embodiment of the present invention will be described with reference to FIG. 17. FIG. 17 is a block diagram illustrating a functional configuration of an analysis system 1700 according to the present example embodiment.

The analysis system 1700 according to the present example embodiment analyzes cryptographic communication between an information communication apparatus 1701 and a communication network 1705. Then, the analysis system 1700 according to the present example embodiment executes specific processing in accordance with the analysis result.

The information communication apparatus 1701 at least includes a computing unit 1701a and a memory unit 1701b. The information communication apparatus 1701 may be any information communication apparatus communicably connected to the communication network 1705.

For example, such an information communication apparatus 1701 may be implemented by use of physical hardware, such as a computer. The information communication apparatus 1701 may also be a virtual computer (VM) provided in a predetermined virtualization infrastructure on which various types of hardware such as an information processing apparatus can be virtualized.

The computing unit 1701a in the information communication apparatus 1701 is a computing apparatus, such as a CPU and an MPU, which reads various types of data and programs stored in the memory unit 1701b and executes various types of computing processing implemented in the program similarly to the computing unit 101a according to the respective above-described example embodiments.

The memory unit 1701b in the information communication apparatus 1701 has functions of a main memory in the information communication apparatus 1701 and stores various types of programs and data processed in the computing unit 1701a similarly to the memory unit 101b according to the respective above-described example embodiments. Further, data stored in the memory unit 1701b may be acquired (dumped) from outside.

The information communication apparatus 1701 may be considered similar to the analysis target apparatus 101 according to the respective example embodiments described above.

The communication network 1705 is a communication network that is composed of a wired communication network, a wireless communication network, or any combination of both, and is capable of establishing a communication channel by use of any communication protocol. Further, for example, the communication network 1705 is able to provide the information communication apparatus 1701 with communication channels encrypted by various types of cryptographic communication protocols described in the respective above-described example embodiments. The communication network 1705 may be considered similar to the communication network 105 according to the respective above-described example embodiments, and therefore detailed description will be omitted.

Next, a configuration of the analysis system 1700 will be described.

The analysis system 1700 according to the present example embodiment includes a data acquisition unit 1702 and a communication processing unit 1703.

Each component of the analysis system 1700 may be respectively provided by use of an information processing apparatus such as a physical computer, or may be provided by use of a VM provided in a virtualization infrastructure. Further, the respective components of the analysis system 1700 are communicably connected with one another by a wireless communication line, a wired communication line, or any communication line combining both. Such a communication line may employ a known technology, and therefore detailed description will be omitted. Each component of the analysis system 1700 will be described below.

The data acquisition unit 1702 is able to acquire at least part of data stored in the memory unit 1701b from the information communication apparatus 1701. A specific method of acquiring data stored in the memory unit 1701b may be appropriately selected depending on a specific configuration of the information communication apparatus 1701. For example, such a data acquisition unit 1702 may be considered similar to the data acquisition unit 102 according to the respective above-described example embodiments.

The communication processing unit 1703 determines whether or not key data including an encryption key used in encryption processing in the cryptographic communication protocol are being stored in the memory unit 1701b in accordance with communication data communicated in accordance with a specific cryptographic communication protocol between the information communication apparatus 1701 and the communication network 1705. The communication processing unit 1703 instructs the memory acquisition unit to acquire data stored in the memory unit in accordance with the determination result. For example, the communication processing unit 1703 may be considered similar to the communication processing unit 103 according to the respective above-described example embodiments.

For example, the communication processing unit 1703 may determine a timing at which a specific condition related to the encryption key is satisfied (for example, a timing when exchange of the encryption key is completed) in a specific cryptographic communication protocol by analyzing communication data. Then, at the timing, the communication processing unit 1703 may instruct the data acquisition unit 1702 to acquire data stored in the memory unit 1701b.

The analysis system 1700 (the data acquisition unit 1702 in particular) as configured above is able to acquire memory area data including an encryption key for encrypting a communication channel between the information communication apparatus 1701 and the communication network 1705 from the memory unit 1701b in the information communication apparatus 1701. The reason is that the communication processing unit 1703 instructs the data acquisition unit 1702 to acquire data stored in the memory unit 1701b when determining that key data including the encryption key are being stored in the memory unit 1701b.

Consequently, the analysis system 1700 according to the present example embodiment is able to acquire data including an encryption key used in cryptographic communication between the information communication apparatus 1701 and the communication network 1705 from the memory unit 1701b in the information communication apparatus 1701.

More specifically, the analysis system 1700 according to the present example embodiment determines whether or not the memory unit 1701b in the information communication apparatus 1701 is storing an encryption key used in the cryptographic communication by analyzing the cryptographic communication data. Then, the analysis system 1700 is able to acquire data stored in the memory unit 1701b in accordance with the determination result.

Third Example Embodiment

Figure 18:
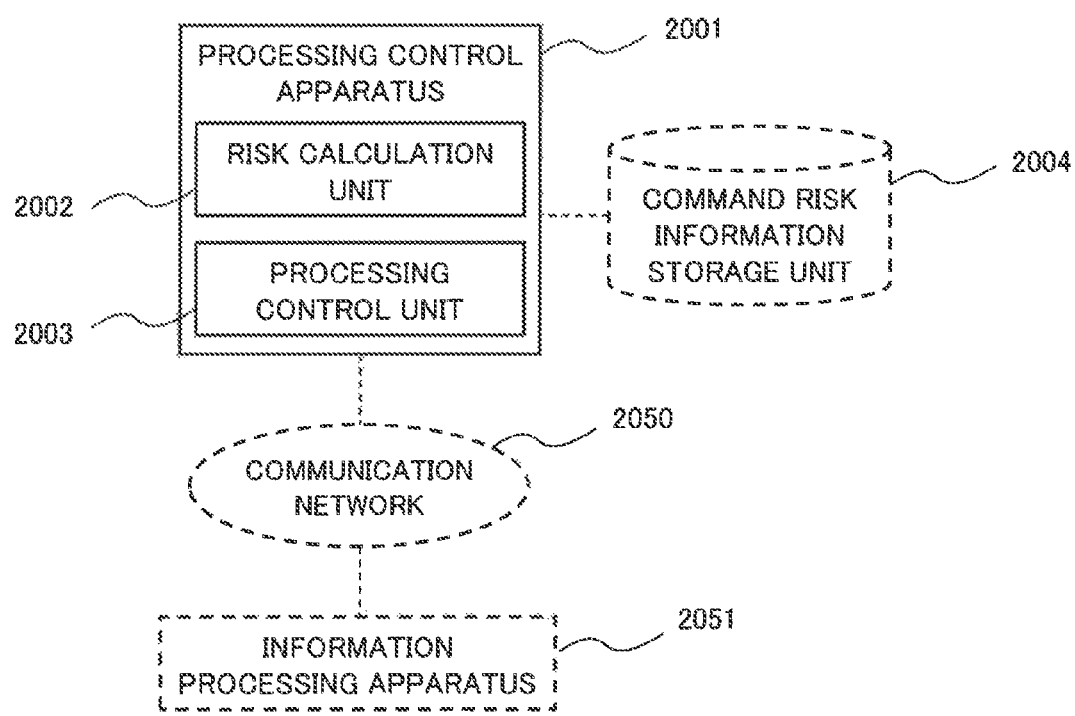
FIG. 18 is a block diagram illustrating a configuration of a processing control apparatus according to a third example embodiment of the present invention.

Referring to FIG. 18, a configuration of a processing control apparatus 2001 according to a third example embodiment of the present invention will be described in detail. FIG. 18 is a block diagram illustrating a configuration of the processing control apparatus 2001 according to the third example embodiment of the present invention.

The processing control apparatus 2001 according to the third example embodiment includes a risk calculation unit (risk calculator) 2002 and a processing control unit (processing controller) 2003.

The processing control apparatus 2001 is able to be communicably connected to an information processing apparatus 2051 through a communication network 2050. The processing control apparatus 2001 executes processing as exemplified in FIG. 19, based on command risk information (to be described later with reference to FIG. 20) stored in a command risk information storage unit 2004 and processing information (to be described later with reference to FIG. 21) indicating processing executed by the information processing apparatus 2051.

Figures 20, 21:
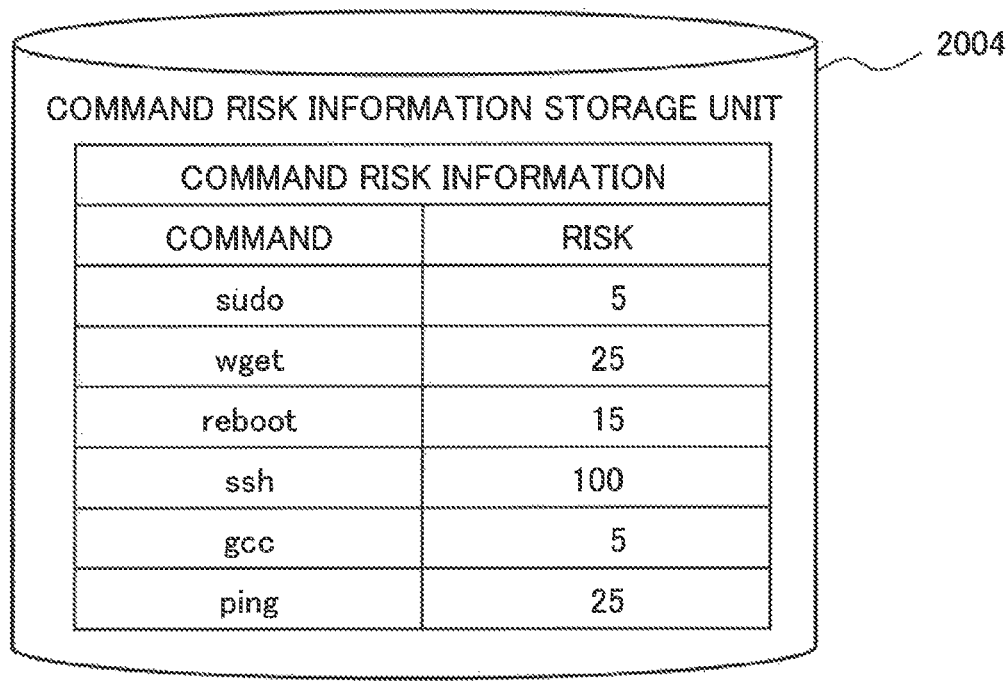
FIG. 20 is a diagram conceptually illustrating an example of command risk information stored in a command risk information storage unit.
FIG. 21 is a diagram conceptually illustrating an example of processing information including processing executed by an information processing apparatus.

It is assumed that the information processing apparatus 2051 executes processing as exemplified in FIG. 21 during a certain period. FIG. 21 is a diagram conceptually illustrating an example of processing information including processing executed by the information processing apparatus 2051.

Referring to FIG. 21, the processing information includes at least one processing operation associated with a command executed by the information processing apparatus 2051 and an argument indicating an input to the command. In the processing, an option for selecting processing relating to the command may be further associated with the command.

The processing information exemplified in FIG. 21 includes processing associated with a command "ping" and an argument "A.B.C.D." The processing represents processing of the command "ping" being executed with the argument "A.B.C.D" as an input. The processing information exemplified in FIG. 21 indicates that the information processing apparatus 2051 has executed processing relating to a command "sudo," processing relating to the command "ping," processing relating to a command "wget," and processing relating to a command "ssh."

For example, the command "ping" represents a command for checking whether or not a communication network is communicably connected. For example, the command "sudo" represents a command for executing predetermined processing while having authority as an administrator. For example, the command "wget" represents a command for acquiring a plurality of files. For example, the command "ssh" represents a command for logging into a communicably connected information processing apparatus 2051, with communication data communicated during the communicably connected period being encrypted.

The processing information is not limited to the example illustrated in FIG. 21. The processing information may be information acquired by decrypting encrypted processing information with encryption key information read by the cryptanalysis unit according to each example embodiment.

The processing control apparatus 2001 determines a risk relating to processing information including processing executed by the information processing apparatus 2051 during a certain period, based on command risk information (exemplified in FIG. 20) stored in the command risk information storage unit 2004. When the risk satisfies a predetermined restriction condition, the processing control apparatus 2001 restricts processing, such as communication processing, to the information processing apparatus 2051. FIG. 20 is a diagram conceptually illustrating an example of command risk information stored in the command risk information storage unit 2004.

For convenience of description, it is assumed that a risk is greater than or equal to 0, and a larger numerical value indicates a higher risk while a numerical value closer to 0 indicates a lower risk in each of the following example embodiments.

In the command risk information exemplified in FIG. 20, a command executable by the information processing apparatus 2051 is associated with a risk relating to processing represented by the command. For example, a command "reboot" is associated with a risk "15" in the command risk information exemplified in FIG. 20. This indicates that a risk (for example, a risk relating to cybersecurity) relating to the command "reboot" is 15. A command "ping" is associated with a risk "25" in the command risk information exemplified in FIG. 20. This indicates that a risk relating to the command "ping" is 25. A command "ssh" is associated with a risk "100" in the command risk information exemplified in FIG. 20. This indicates that a risk relating to the command "ssh" is 100.

For example, the command "reboot" represents a command for rebooting the information processing apparatus 2051. For example, a command "gcc" represents a command for compiling a program described by use of the C language.

A command, a risk, and command risk information are not limited to the example described above with reference to FIG. 20.

For convenience of description, it is hereinafter assumed that a risk is 0 for a command not included in the command risk information.

Figure 19:
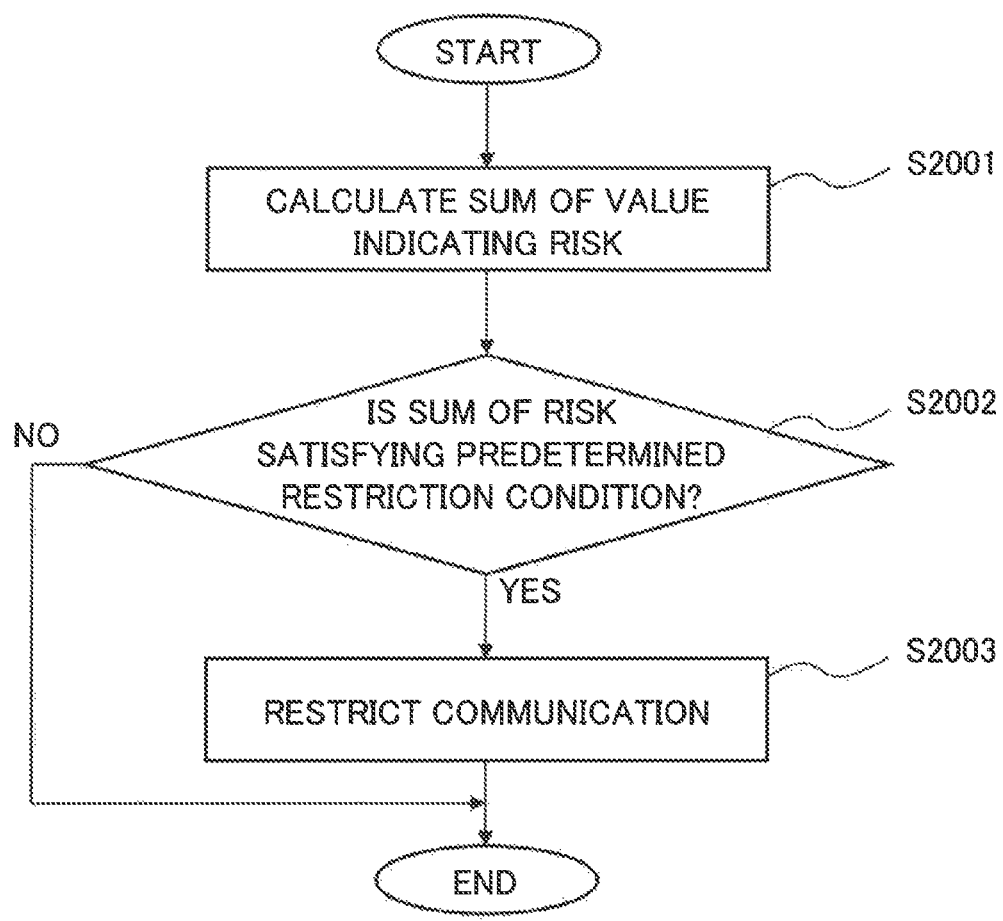
FIG. 19 is a flowchart illustrating a processing flow in the processing control apparatus according to the third example embodiment.

Next, referring to FIG. 19, processing in the processing control apparatus 2001 according to the third example embodiment of the present invention will be described in detail. FIG. 19 is a flowchart illustrating a processing flow in the processing control apparatus 2001 according to the third example embodiment.

The processing control apparatus 2001 inputs processing information (exemplified in FIG. 21) indicating processing executed by the information processing apparatus 2051. The processing control apparatus 2001 may receive processing information transmitted by the information processing apparatus 2051 through the communication network 2050 or may read processing information from a storage apparatus (not illustrated in FIG. 18) storing the processing information. When the information processing apparatus 2051 is a virtual machine, the processing control apparatus 2001 may read a memory in an information processing apparatus that physically executes processing relating to the virtual machine. The procedure of inputting processing information (exemplified in FIG. 21) by the processing control apparatus 2001 is not limited to the aforementioned example.

In the processing control apparatus 2001, the risk calculation unit 2002 calculate a sum of numerical values each indicating a risk relating to processing included in the input processing information, based on command risk information (Step S2001). For example, with respect to processing included in the processing information, the risk calculation unit 2002 reads a command constituting the processing and specifies a risk associated with the command, based on the command risk information (exemplified in FIG. 20). The risk calculation unit 2002 calculates a risk relating to the processing information (that is, processing operations executed by the information processing apparatus 2051 during a certain period) by specifying risks with respect to processing included in the processing information and adding the specified risks.

Next, the processing control unit 2003 determines whether or not a numerical value indicating the risk calculated by the risk calculation unit 2002 satisfies a predetermined restriction condition (Step S2002). For example, the predetermined restriction condition is "a risk is greater than or equal to a predetermined threshold value." In this case, the processing control unit 2003 determines whether or not the risk calculated by the risk calculation unit 2002 is greater than or equal to the predetermined threshold value.

When the numerical value indicating the risk relating to the processing information satisfies the predetermined restriction condition (YES in Step S2002), the processing control unit 2003 restricts processing, such as communication processing, to the information processing apparatus 2051 (Step S2003). When the numerical value indicating the risk relating to the processing information does not satisfy the predetermined restriction condition (NO in Step S2002), the processing indicated in Step S2003 is not executed.

When restricting processing to the information processing apparatus 2051, for example, the processing control unit 2003 restricts a communication bandwidth allocated to the information processing apparatus 2051 in the communication network 2050. Alternatively, when restricting processing, such as communication, to the information processing apparatus 2051, for example, the processing control unit 2003 obstructs communication to the information processing apparatus 2051 in the communication network 2050. For example, the processing of restricting processing to the information processing apparatus 2051 may be processing included in control information to be described later with reference to FIG. 24 and is not limited to the aforementioned example.

Next, an advantageous effect relating to the processing control apparatus 2001 according to the third example embodiment of the present invention will be described.

The processing control apparatus 2001 according to the third example embodiment is able to more reliably maintain soundness of an information processing system in a cybersecurity field. The reason is that, by calculating, with respect to processing information including one or more processing operations executed by the information processing apparatus 2051 during a certain period, a sum of risks of the respective processing operations included in the processing information, the processing control apparatus 2001 calculates a risk relating to the processing information, and when the risk relating to the processing information is high, restricts processing, such as communication, to the information processing apparatus 2051. Accordingly, when the risk relating to the processing executed by the information processing apparatus 2051 during the certain period has a large value, communication to the information processing apparatus 2051 is restricted by the processing control apparatus 2001. Accordingly, the processing control apparatus 2001 according to the third example embodiment is able to more reliably maintain soundness of an information processing system in a cybersecurity field.

Fourth Example Embodiment

Next, a fourth example embodiment of the present invention based on the aforementioned third example embodiment will be described.

In the following description, a part characteristic of the present example embodiment will be mainly described, and also a same reference numeral is given to a similar configuration described in the aforementioned third example embodiment, thus omitting redundant description.

Figure 22:
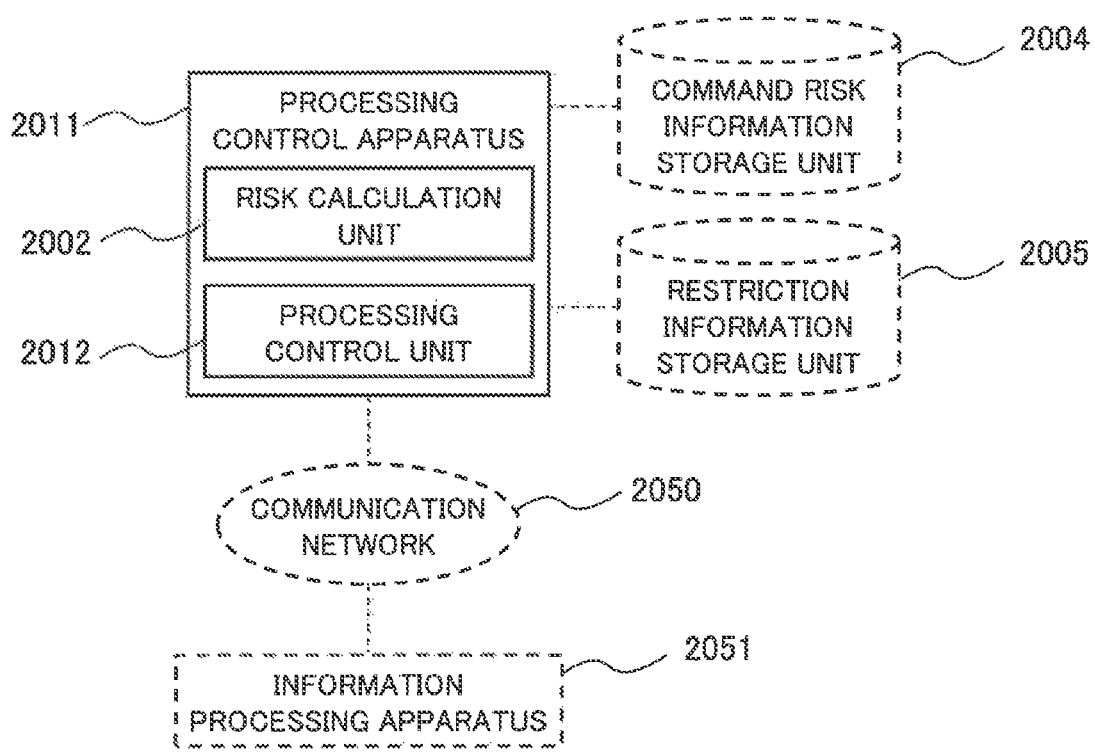
FIG. 22 is a block diagram illustrating a configuration of a processing control apparatus according to a fourth example embodiment of the present invention.

Referring to FIG. 22, a configuration of a processing control apparatus 2011 according to the fourth example embodiment of the present invention will be described in detail. FIG. 22 is a block diagram illustrating a configuration of the processing control apparatus 2011 according to the fourth example embodiment of the present invention.

The processing control apparatus 2011 according to the fourth example embodiment includes a risk calculation unit (risk calculator) 2002 and a processing control unit (processing controller) 2012.

The processing control apparatus 2011 is able to be communicably connected to an information processing apparatus 2051 through a communication network 2050. The processing control apparatus 2011 executes processing as exemplified in FIG. 23, based on command risk information (exemplified in FIG. 20) stored in a command risk information storage unit 2004, restriction information (to be described later with reference to FIG. 24) stored in a restriction information storage unit 2005, and processing information (exemplified in FIG. 21) indicating processing executed by the information processing apparatus 2051.

It is assumed that the information processing apparatus 2051 according to the present example embodiment is a virtual machine.

Figure 24:
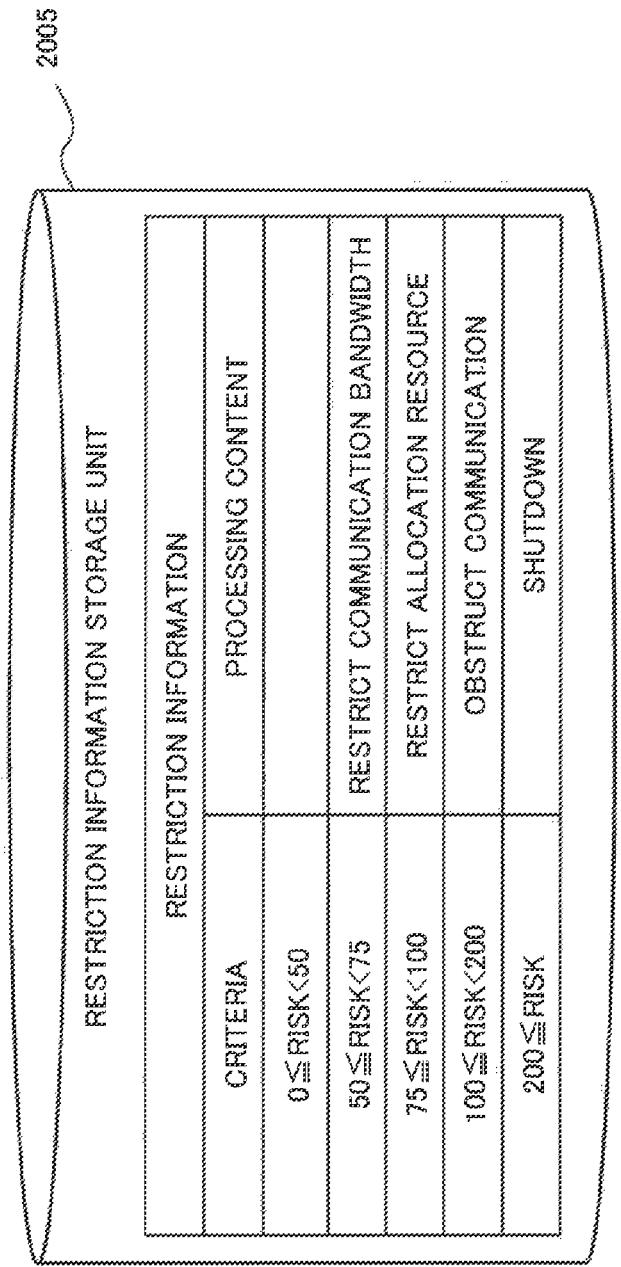
FIG. 24 is a diagram conceptually illustrating an example of restriction information stored in a restriction information storage unit.

Referring to FIG. 24, restriction information will be described. FIG. 24 is a diagram conceptually illustrating an example of restriction information stored in the restriction information storage unit 2005.

Referring to FIG. 24, the restriction information associates a calculated risk for processing information (exemplified in FIG. 21) indicating processing executed by the information processing apparatus 2051 with a processing content indicating processing executed on the information processing apparatus 2051 when the calculated risk satisfies the criterion. As exemplified in FIG. 24, for example, a processing content indicates processing of restricting processing, such as communication, to the information processing apparatus 2051, or processing of stopping the information processing apparatus 2051.

In the restriction information exemplified in FIG. 24, a criterion "50≤risk<75" is associated with a processing content "restrict a communication bandwidth." This indicates that, when a risk related to processing information (exemplified in FIG. 21) relating to processing executed by the information processing apparatus 2051 has a value greater than or equal to 50 and less than 75, the processing control apparatus 2011 executes processing of restricting a communication bandwidth on the information processing apparatus 2051. Further, a criterion "0≤risk<50" is associated with a processing content "(null)" in the restriction information exemplified in FIG. 24. This indicates that, when a risk relating to processing information (exemplified in FIG. 21) indicating processing executed by the information processing apparatus 2051 has a value greater than or equal to 0 and less than 50, the processing control apparatus 2011 does not execute processing exemplified in FIG. 24 on the information processing apparatus 2051. As described above referring to FIG. 24, it is assumed that, as a risk is higher, a restriction degree of processing relating to the information processing apparatus 2051 is higher in the restriction information.

The restriction information is not limited to the aforementioned example.

Figure 23:
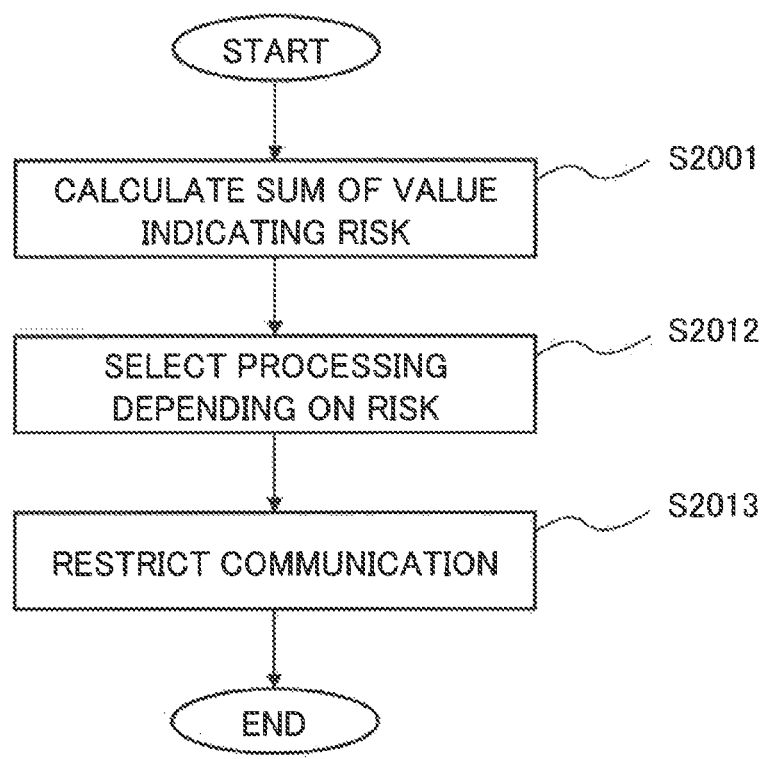
FIG. 23 is a flowchart illustrating a processing flow in the processing control apparatus according to the fourth example embodiment.

Next, referring to FIG. 23, processing in the processing control apparatus 2011 according to the fourth example embodiment of the present invention will be described in detail. FIG. 23 is a flowchart illustrating a processing flow in the processing control apparatus 2011 according to the fourth example embodiment.

In the processing control apparatus 2011, the risk calculation unit 2002 calculates a sum of numerical values each indicating a risk relating to processing included in input processing information (exemplified in FIG. 21), based on command risk information (exemplified in FIG. 20) (Step S2001).

Next, the processing control unit 2012 specifies a criterion including the risk calculated by the risk calculation unit 2002 in restriction information (exemplified in FIG. 24) and selects a processing content relating to the specified criterion (Step S2012). For example, when the risk calculated by the risk calculation unit 2002 is 124, the criterion "100≤risk<200" includes the risk "124". In this case, the processing control unit 2012 selects a processing content "obstruct communication" associated with the criterion "100≤risk<200" in the restriction information (exemplified in FIG. 24).

The processing control unit 2012 executes processing relating to the information processing apparatus 2051 in accordance with the selected processing content (Step S2013). For example, when selecting the processing content "obstruct communication," the processing control unit 2012 obstructs communication to the information processing apparatus 2051.

With regard to the restriction information exemplified in FIG. 24, the processing control unit 2012 executes processing as follows. Specifically, When the risk is greater than or equal to 50 and less than 75, a communication bandwidth is restricted with respect to communication to the information processing apparatus 2051, When the risk is greater than or equal to 75 and less than 100, a computer resource allocated to processing executed by the information processing apparatus 2051 is restricted (for example, an allocation period of a computer resource to processing executed by the information processing apparatus 2051 is shortened), When the risk is greater than or equal to 100 and less than 200, communication to the information processing apparatus 2051 is obstructed, When the risk is greater than 200, the information processing apparatus 2051 is shut down (stopped), and When the risk is greater than or equal to 0 and less than 50, none of the aforementioned four processing operations are executed on the information processing apparatus 2051.

In other words, the processing control unit 2012 determines a processing restriction degree relating to the information processing apparatus 2051, based on the restriction information (exemplified in FIG. 24), depending on a magnitude of the risk calculated by the risk calculation unit 2002, and restricts processing relating to the information processing apparatus 2051, in accordance with the determined degree.

While it is assumed that the information processing apparatus 2051 according to the present example embodiment is a virtual machine, the apparatus may be a physical information processing apparatus, and in this case, the restriction information (exemplified in FIG. 24) does not need to include processing unique to a virtual machine (for example, restricting a computer resource for a virtual machine).

Next, advantageous effects relating to the processing control apparatus 2011 according to the fourth example embodiment of the present invention will be described.

The processing control apparatus 2011 according to the fourth example embodiment is able to more reliably maintain soundness of an information processing system in a cybersecurity field. The reason is similar to the reason described in the third example embodiment.

Furthermore, the processing control apparatus 2011 according to the fourth example embodiment is able to more flexibly handle a risk to an information processing system. The reason is that the processing control apparatus 2011 restricts processing relating to the information processing apparatus 2051 depending on a magnitude of a risk relating to processing information (exemplified in FIG. 21) indicating processing executed in the information processing apparatus 2051.

Fifth Example Embodiment

Next, a fifth example embodiment of the present invention based on the aforementioned third example embodiment will be described.

In the following description, a characteristic part of the present example embodiment will be mainly described, and also a same reference numeral is given to a similar configuration described in the aforementioned third example embodiment, thus omitting redundant description.

Figure 25:
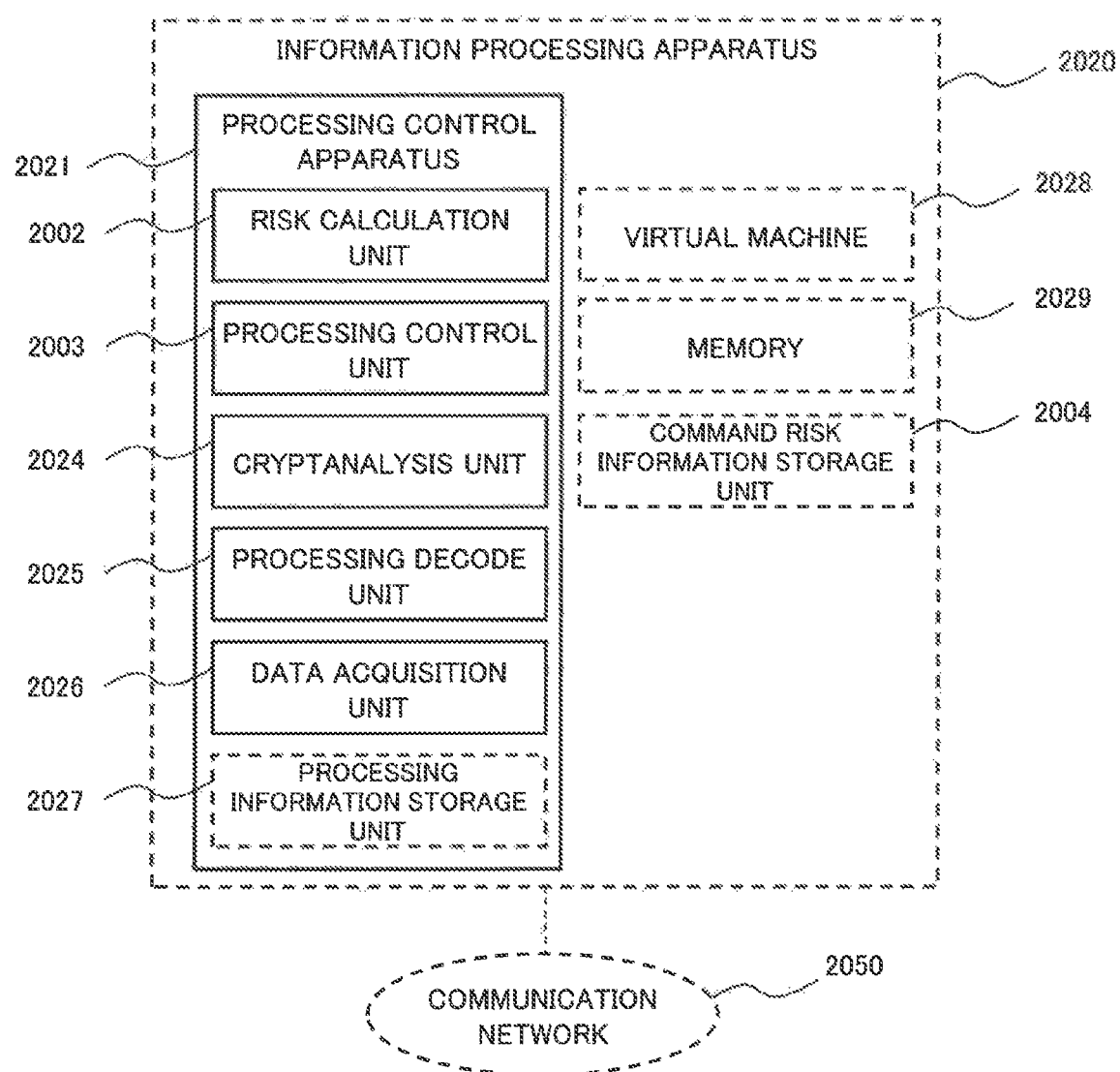
FIG. 25 is a block diagram illustrating a configuration of an information processing apparatus including a processing control apparatus according to a fifth example embodiment of the present invention.

Referring to FIG. 25, a configuration of an information processing apparatus 2020 including a processing control apparatus 2021 according to the fifth example embodiment of the present invention will be described in detail. FIG. 25 is a block diagram illustrating a configuration of the information processing apparatus 2020 including the processing control apparatus 2021 according to the fifth example embodiment of the present invention.

The information processing apparatus 2020 includes the processing control apparatus 2021, a virtual machine 2028, a command risk information storage unit 2004, and a memory 2029. The processing control apparatus 2021 includes a risk calculation unit (risk calculator) 2002, a processing control unit (processing controller) 2003, a cryptanalysis unit (crypt-analyzer) 2024, a processing decode unit (processing controller) 2025, and a data acquisition unit (data acquirer) 2026. The processing control apparatus 2021 may further include a processing information storage unit 2027.

The information processing apparatus 2020 is communicably connected to a communication network 2050 and is able to communicate with an external information processing apparatus 2020.

The virtual machine 2028 may execute processing in accordance with a program to be analyzed. Further, the virtual machine 2028 does not need to include a function of analyzing a program, such as a debugger, a disassembler, or a decompiler.

The cryptanalysis unit 2024 has a function similar to the function of the cryptanalysis unit 104 illustrated in FIG. 1. The data acquisition unit 2026 has a function similar to the function of the data acquisition unit 102 illustrated in FIG. 1 or the data acquisition unit 1702 illustrated in FIG. 17. For example, the virtual machine 2028 has a function similar to the function of the computing unit 101a illustrated in FIG. 1 or the computing unit 1701a illustrated in FIG. 17. For example, the memory 2029 is able to store data accessed when processing relating to the virtual machine 2028 is actually processed. When executing processing relating to the virtual machine 2028, the information processing apparatus 2020 accesses data stored in the memory 2029.

For convenience of description, it is assumed that a communication to the virtual machine 2028 is encrypted in accordance with a cryptographic method. It is further assumed that the processing information storage unit 2027 has stored processing information encrypted in accordance with the cryptographic method (hereinafter referred to as "encrypted processing information"). In this case, a communication processing unit (exemplified in FIG. 1, 2, 3, or 17) monitors encrypted communication data, and based on the communication data, generates encrypted processing information by encrypting processing information (exemplified in FIG. 21).

Figure 26:
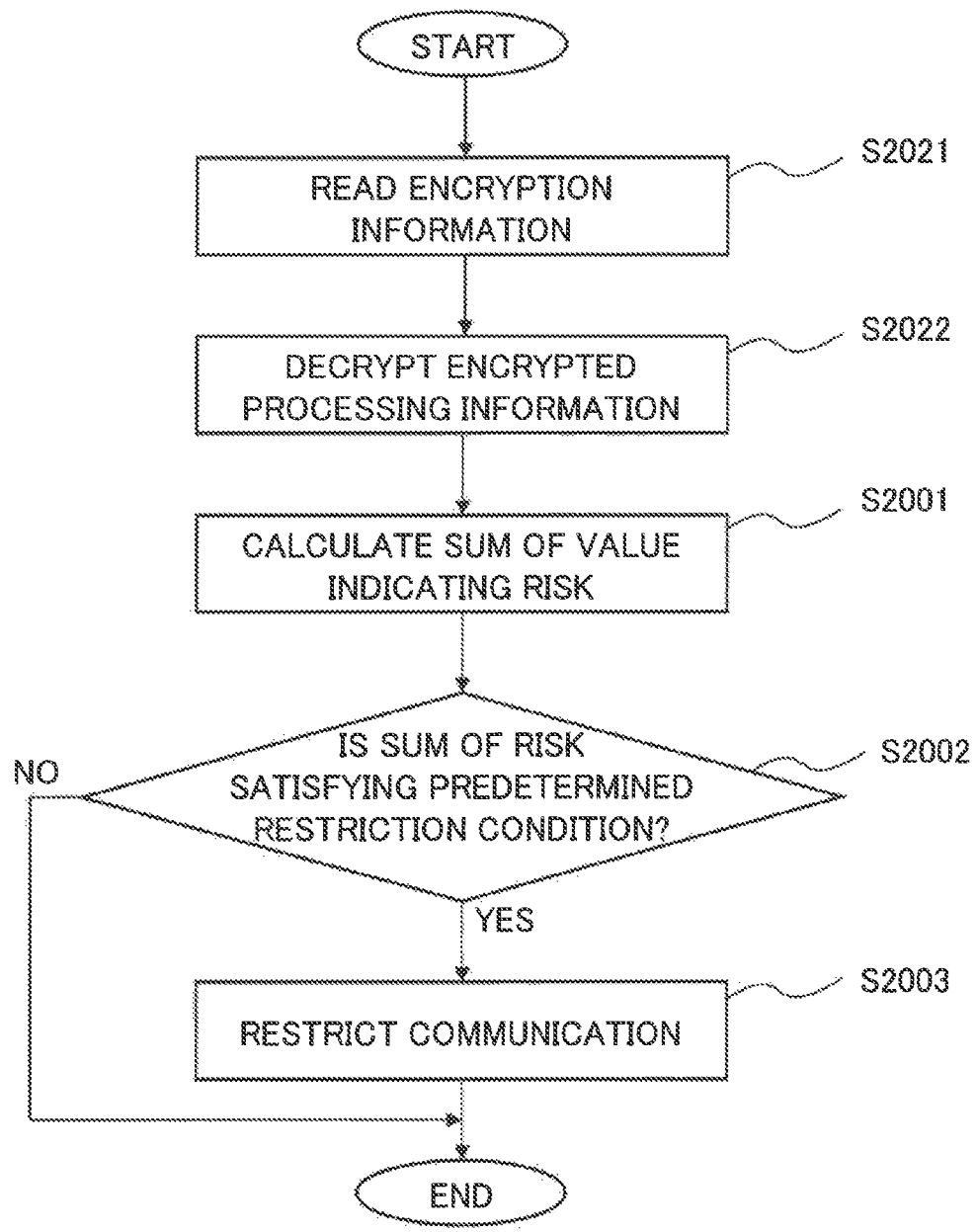
FIG. 26 is a flowchart illustrating a processing flow in the information processing apparatus according to the fifth example embodiment.

Next, referring to FIG. 26, processing in the information processing apparatus 2020 according to the fifth example embodiment of the present invention will be described in detail. FIG. 26 is a flowchart illustrating a processing flow in the information processing apparatus 2020 according to the fifth example embodiment.

The cryptanalysis unit 2024 executes the processing as described with reference to Steps S1101 to S1105 in FIG. 11, Steps S1201 to S1208 in FIGS. 12A and 12B, and Step S1210 in FIG. 12A (or Step S1209B in FIG. 12B), FIG. 14, or FIG. 15. By the processing, the cryptanalysis unit 2024 reads encryption information indicating an encryption key (Step S2021).

The processing decode unit 2025 reads encrypted processing information from the processing information storage unit 2027 and decrypts the encrypted processing information by use of the encryption information read by the cryptanalysis unit 2024 (Step S2022). For example, the processing decode unit 2025 executes the processing described with reference to Step S1106 indicated in FIG. 11, Step S1210 indicated in FIG. 12A, Step S1209B indicated in FIG. 12B, Step S1505 indicated in FIG. 15, or FIG. 16, or the like. Consequently, the processing decode unit 2025 generates processing information (exemplified in FIG. 21) by decrypting the encrypted processing information.

Subsequently, processing similar to the processing illustrated in FIG. 19 is executed on the decrypted processing information.

Next, advantageous effects relating to the processing control apparatus 2021 according to the fifth example embodiment of the present invention will be described.

The processing control apparatus 2021 according to the fifth example embodiment is able to more reliably maintain soundness of an information processing system in a cybersecurity field. The reason is similar to the reason described in the third example embodiment.

Furthermore, the processing control apparatus 2021 according to the fifth example embodiment is able to more reliably maintain soundness of an information processing system in a cybersecurity field, even when an encrypted communication is executed. The reason is that, by executing processing similar to that by the analysis systems illustrated in the first to third example embodiments, the processing control apparatus 2021 according to the fifth example embodiment decrypts an encrypted communication and controls communication, based on a risk relating to processing information (exemplified in FIG. 21) indicating processing relating to the decrypted communication.

Further, depending on whether or not the virtual machine 2028 in which processing is executed in accordance with a target program to be analyzed has a function of analyzing a program, processing relating to the target program may vary. For example, malware stops processing when the virtual machine 2028 has the function of analyzing a program and executes malicious processing when the virtual machine 2028 does not have the function of analyzing a program. Accordingly, when the virtual machine 2028 does not have the function of analyzing a program, the processing control apparatus 2021 according to the present example embodiment is able to more reliably maintain soundness of an information processing system in a cybersecurity field, even in a case of a program executing various processing depending on whether or not the function of analyzing a program is included.

(Hardware Configuration Example)

A configuration example of hardware resources that achieve an analysis system according to the first example embodiment of the present invention, an analysis system according to the second example embodiment, or a processing control apparatus according to third to fifth example embodiments will be described. However, the analysis system or the processing control apparatus may be achieved by using physically or functionally at least two calculation processing apparatuses. Further, the analysis system or the processing control apparatus may be achieved as a dedicated apparatus.

Figure 27:
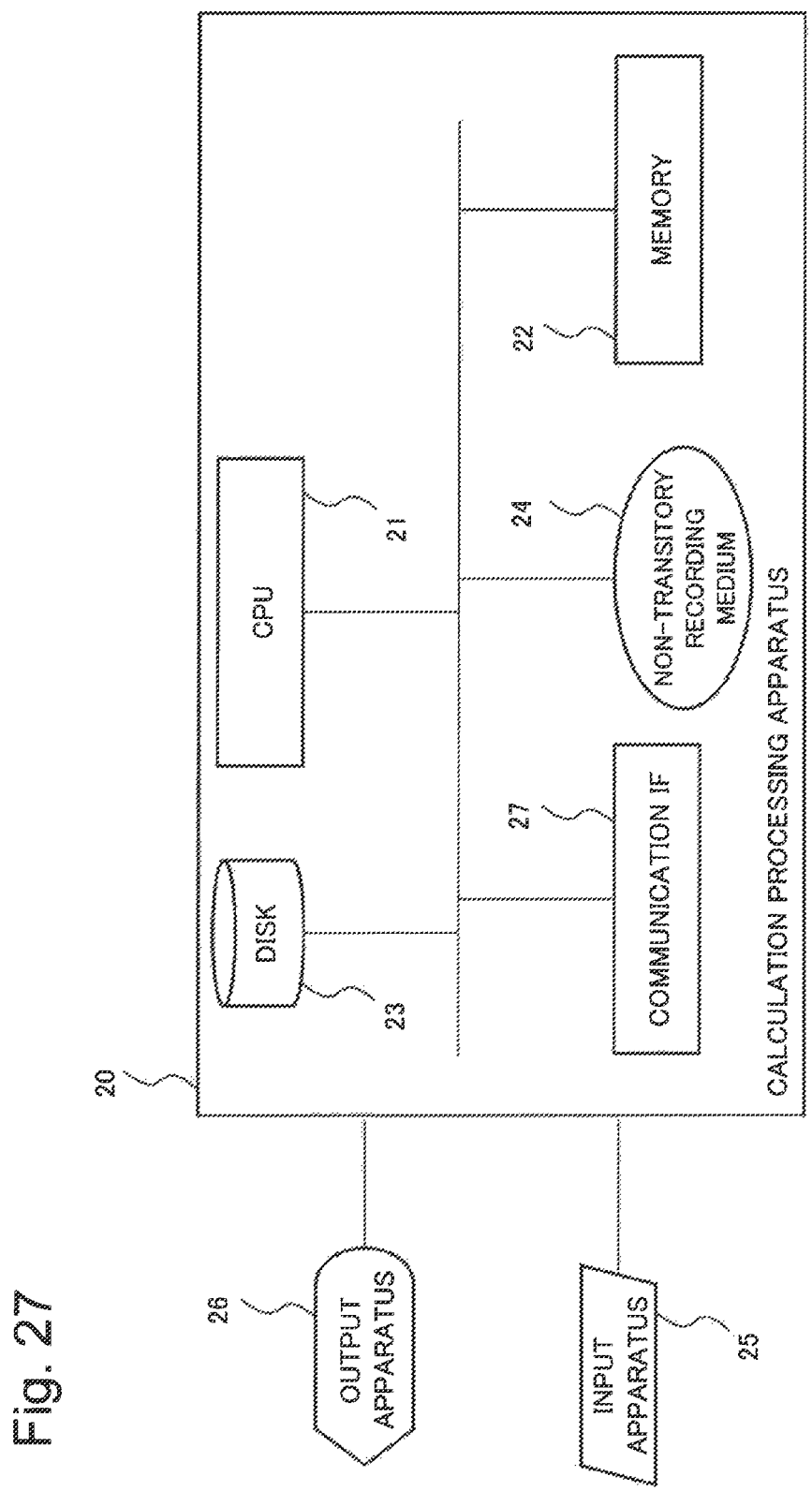
FIG. 27 is a block diagram schematically illustrating a hardware configuration of a calculation processing apparatus capable of achieving an analysis system according to the first example embodiment, an analysis system according to the second example embodiment, or a processing control apparatus according to third to fifth example embodiments.

FIG. 27 is a block diagram schematically illustrating a hardware configuration of a calculation processing apparatus capable of achieving an analysis system according to the first example embodiment, an analysis system according to the second example embodiment, or a processing control apparatus according to third to fifth example embodiments. A calculation processing apparatus 20 includes a central processing unit (CPU) 21, a memory 22, a disk 23, a non-transitory recording medium 24, and a communication interface (hereinafter, expressed as. "communication I/F") 27. The calculation processing apparatus 20 may connect an input apparatus 25 and an output apparatus 26. The calculation processing apparatus 20 can execute transmission/reception of information to/from another calculation processing apparatus and a communication apparatus via the communication I/F 27.

The non-transitory recording medium 24 is, for example, a computer-readable Compact Disc, Digital Versatile Disc. The non-transitory recording medium 24 may be Universal Serial Bus (USB) memory, Solid State Drive or the like. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory recording medium 24.

In other words, the CPU 21 copies, on the memory 22, a software program (a computer program: hereinafter, referred to simply as a "program") stored by the disk 23 when executing the program and executes arithmetic processing. The CPU 21 reads data necessary for program execution from the memory 22. When output is needed, the CPU 21 output an output result to the output apparatus 26. When a program is input from the outside, the CPU 21 reads the program from the input apparatus 25. The CPU 21 interprets and executes a program (FIG. 11, FIG. 12A, FIG. 12B, or FIGS. 14-16) or a processing control program (FIG. 19, FIG. 23, or FIG. 26) present on the memory 22 corresponding to a function (processing) indicated by each unit illustrated in FIGS. 1-3, FIG. 17, FIG. 18, FIG. 22, or FIG. 25 described above. The CPU 21 sequentially executes the processing described in each example embodiment of the present invention.

In other words, in such a case, it is conceivable that the present invention can also be made using the analysis program or the processing control program. Further, it is conceivable that the present invention can also be made using a computer-readable, non-transitory recording medium storing the analysis program or the processing control program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2016-124682, filed on Jun. 23, 2016, the disclosure of which is incorporated herein in its entirety.

REFERENCE SIGNS LIST

100 Analysis system
101 Analysis target apparatus
102 Memory acquisition unit
103 Communication processing unit
104 Cryptanalysis unit
105 Communication network
106 Communication channel
107 Another information communication apparatus
1700 Analysis system
1701 Information communication apparatus
1702 Data acquisition unit
1703 Communication processing unit
1705 Communication network
2001 Processing control apparatus
2002 Risk calculation unit
2003 Processing control unit
2004 command risk information storage unit
2050 communication network
2051 information processing apparatus
2011 processing control apparatus
2012 processing control unit
2005 restriction information storage unit
2020 information processing apparatus
2021 processing control apparatus
2024 cryptanalysis unit
2025 processing decode unit
2026 data acquisition unit
2027 processing information storage unit
2028 virtual machine
2029 memory
20 calculation processing apparatus
21 CPU
22 memory
23 disk
24 non-transitory recording medium
25 input apparatus
26 output apparatus
27 communication IF

The invention claimed is:

1. A processing control apparatus comprising:
a risk calculator configured to calculate a sum of a value indicating a risk included in processing information that includes one or more processing executed on a virtual machine during a certain period; and
a processing controller configured to restrict processing to the virtual machine by restricting communication bandwidth allocated to the virtual machine, reducing processing time allocated to the virtual machine, obstructing communication to the virtual machine, or executing shutdown of the virtual machine depending on the calculated value indicating the risk; and
a cryptanalyzer configured to specify cryptographic method information for identifying cryptographic method for communication connection in a first communication message communicated at trying to establish the communication connection in accordance with the cryptographic method by the virtual machine, determine whether or not encryption key information indicating an encryption key for the cryptographic method is being stored in a memory that a physical information processing apparatus for executing processing of the virtual machine while the first message is stored in the memory, and acquire the encryption key information from the memory when the encryption key information is being stored in the memory; wherein
the risk calculator decrypts the encrypted processing information with the encryption key information acquired by the cryptanalyzer when the processing information is encrypted.

2. The processing control apparatus according to claim 1, wherein
the cryptanalyzer specifies, in the memory, a memory area storing tag information indicating a tag for a memory area storing an encryption key relating to the specified cryptographic method and acquires the encryption key information from a memory area relating to the specified tag information.

3. The processing control apparatus according to claim 1, wherein
the cryptanalyzer acquires, as the encryption key information, data stored in a certain memory area in the memory when determining that the encryption key information is being stored in the memory, the data having information entropy more than a specific reference value.

4. The processing control apparatus according to claim 3, wherein
the cryptanalyzer acquire, as the encryption key information, data stored in a first memory area when information obtained by decrypting the processing information with data stored in the first memory area includes an executable code by the virtual machine in case when the number of the memory areas including data with the information entropy more than the specific reference value is plural.

5. A processing control method comprising:
calculating a sum of a value indicating a risk included in processing information that includes one or more processing executed on an a virtual machine during a certain period; and
restricting processing to the virtual machine by restricting communication bandwidth allocated to the virtual machine, reducing processing time allocated to the virtual machine, obstructing communication to the virtual machine, or executing shutdown of the virtual machine depending on the calculated value indicating the risk; and
specifying cryptographic method information for identifying cryptographic method for communication connection in a first communication message communicated at trying to establish the communication connection in accordance with the cryptographic method by the virtual machine, determine whether or not encryption key information indicating an encryption key for the cryptographic method is being stored in a memory that a physical information processing apparatus for executing processing of the virtual machine while the first message is stored in the memory, and acquire the encryption key information from the memory when the encryption key information is being stored in the memory; wherein
the calculating decrypts the encrypted processing information with the acquired encryption key information when the processing information is encrypted.

6. A non-transitory recoding medium storing a processing control program, the program causing a computer to achieve:
a risk calculation function configured to calculate a sum of a value indicating a risk included in processing information that includes one or more processing executed on a virtual machine during a certain period; and
a processing control function configured to restrict processing to the virtual machine by restricting communication bandwidth allocated to the virtual machine, reducing processing time allocated to the virtual machine, obstructing communication to the virtual machine, or executing shutdown of the virtual machine depending on the calculated value indicating the risk; and
a cryptanalysis function configured to specify cryptographic method information for identifying cryptographic method for communication connection in a first communication message communicated at trying to establish the communication connection in accordance with the cryptographic method by the virtual machine, determine whether or not encryption key information indicating an encryption key for the cryptographic method is being stored in a memory that a physical information processing apparatus for executing processing of the virtual machine while the first message is stored in the memory, and acquire the encryption key information from the memory when the encryption key information is being stored in the memory; wherein
the risk calculation function decrypts the encrypted processing information with the encryption key information acquired by the cryptanalysis function when the processing information is encrypted.

* * * * *